(12) United States Patent
Kajimoto

(10) Patent No.: US 9,858,204 B2
(45) Date of Patent: Jan. 2, 2018

(54) CACHE DEVICE, CACHE SYSTEM, AND CACHE METHOD

(71) Applicant: NEC Corporation, Tokyo (JP)

(72) Inventor: Youhei Kajimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 33 days.

(21) Appl. No.: 14/964,074

(22) Filed: Dec. 9, 2015

(65) Prior Publication Data

US 2016/0196211 A1 Jul. 7, 2016

(30) Foreign Application Priority Data

Dec. 11, 2014 (JP) ................................ 2014-250580

(51) Int. Cl.
| | |
|---|---|
| *G06F 12/12* | (2016.01) |
| *G06F 12/121* | (2016.01) |
| *G06F 12/0813* | (2016.01) |
| *G06F 12/0811* | (2016.01) |
| *G06F 12/0873* | (2016.01) |

(52) U.S. Cl.
CPC ........ *G06F 12/121* (2013.01); *G06F 12/0873* (2013.01); *G06F 12/0811* (2013.01); *G06F 12/0813* (2013.01); *G06F 2212/1044* (2013.01); *G06F 2212/313* (2013.01)

(58) Field of Classification Search
None
See application file for complete search history.

(56) References Cited

U.S. PATENT DOCUMENTS 6,629,200 B1 9/2003 Kanamaru et al.
7,853,755 B1 * 12/2010 Agarwal ............. G06F 12/0811
711/141

(Continued)

FOREIGN PATENT DOCUMENTS

JP 2001-117817 A 4/2001
JP 2007-206949 A 8/2007

(Continued)

OTHER PUBLICATIONS

Japanese Decision to Grant a Patent issued in Japanese Patent Application No. 2014-250580, dated Jul. 18, 2017, 5 pages.

(Continued)

*Primary Examiner* — Denise Tran
(74) *Attorney, Agent, or Firm* — Wilmer Cutler Pickering Hale and Dorr LLP

(57) ABSTRACT

A cache device connected to a storage device and connected to a plurality of sources, including a cache unit that relays a read request and a read response between a source and a storage device, and a storage area control unit that stores the source as a first history in association with specification of first data in a read request, and, if the first data are not retained by the cache unit and a storage area sufficient for retaining the first data does not exist, selects data associated with a less number of the sources in the first history as second data in preference to data associated with a greater number of the sources out of the first data or data retained by the cache unit, and, if the second data differ from the first data, causes the cache unit to discard the second data and then store the first data.

10 Claims, 23 Drawing Sheets

(56) References Cited

U.S. PATENT DOCUMENTS

| | | | |
|---|---|---|---|
| 2008/0235456 A1* | 9/2008 | Kornegay | G06F 12/121 711/130 |
| 2012/0290790 A1* | 11/2012 | Meirosu | G06F 12/121 711/118 |
| 2013/0111138 A1 | 5/2013 | Suzuki et al. | |
| 2014/0258375 A1* | 9/2014 | Munoz | H04L 67/2847 709/203 |

FOREIGN PATENT DOCUMENTS

| | | |
|---|---|---|
| JP | 2010-049502 A | 3/2010 |
| JP | 2012-118745 A | 6/2012 |
| WO | WO-2011/161829 A1 | 12/2011 |

OTHER PUBLICATIONS

Long, Yusuke [outside] [operation of upper level cache] "The Substitution Technique of the Lower Level Cache Taken into Consideration", 73rd time (Heisei 23(2011)) of Information Processing Society of Japan National Conference Lecture Collected-papers (1) Architecture Software Science and Engineering A database, media, Japan, General Incorporated Foundation Information Processing Society of Japan, Mar. 2, 2011, pp. 1-179 and 1-180 (2 pages). Retrieved from website https://ipsj.ixsq.nii.ac.jp/ej/index.php?action=pages_view_main&active_action=repository_action_common_download&item_id=107717&item_no=1&attribute_id=1&file_no=1&page_id=13&block_id=8.

* cited by examiner

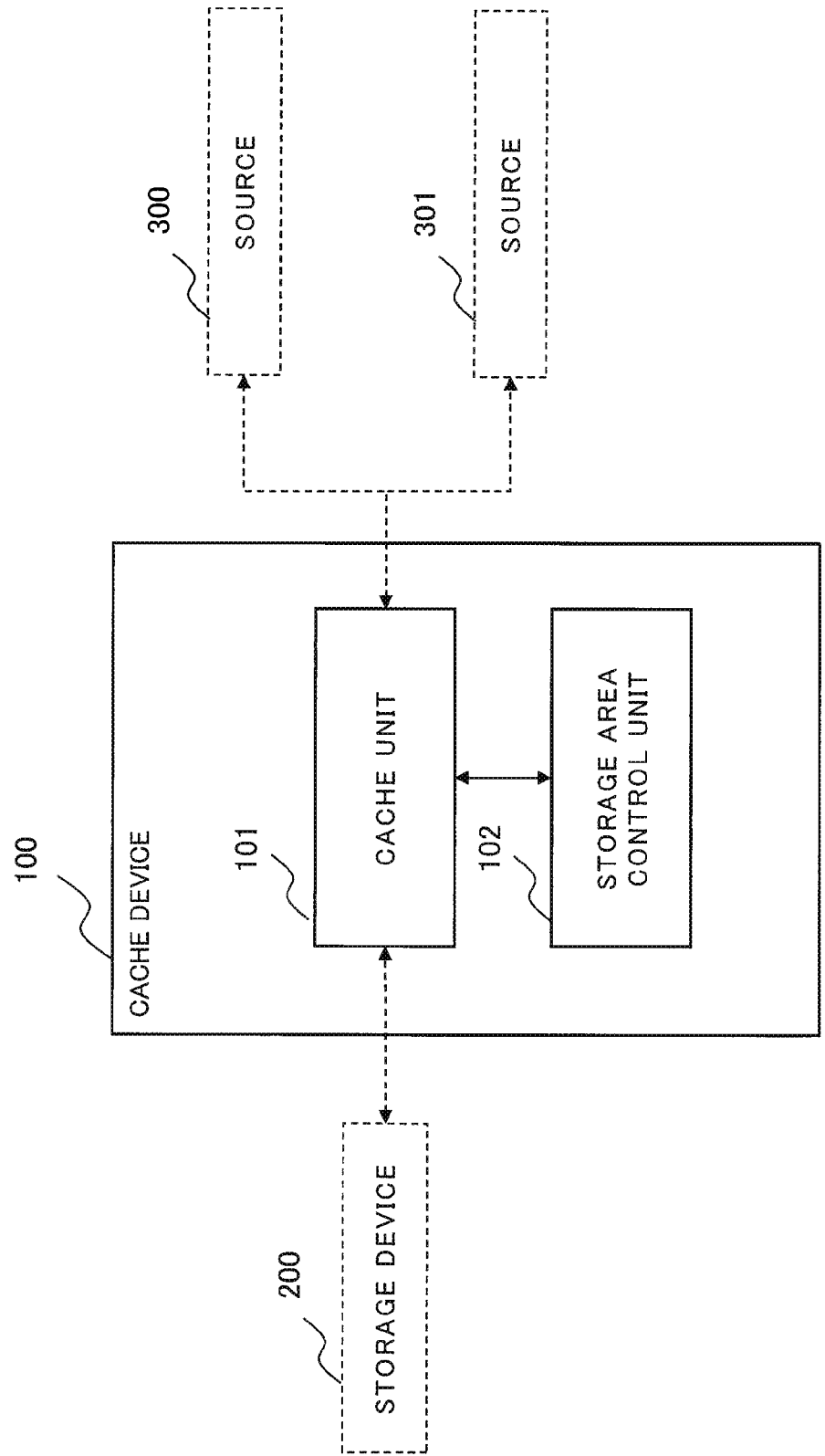

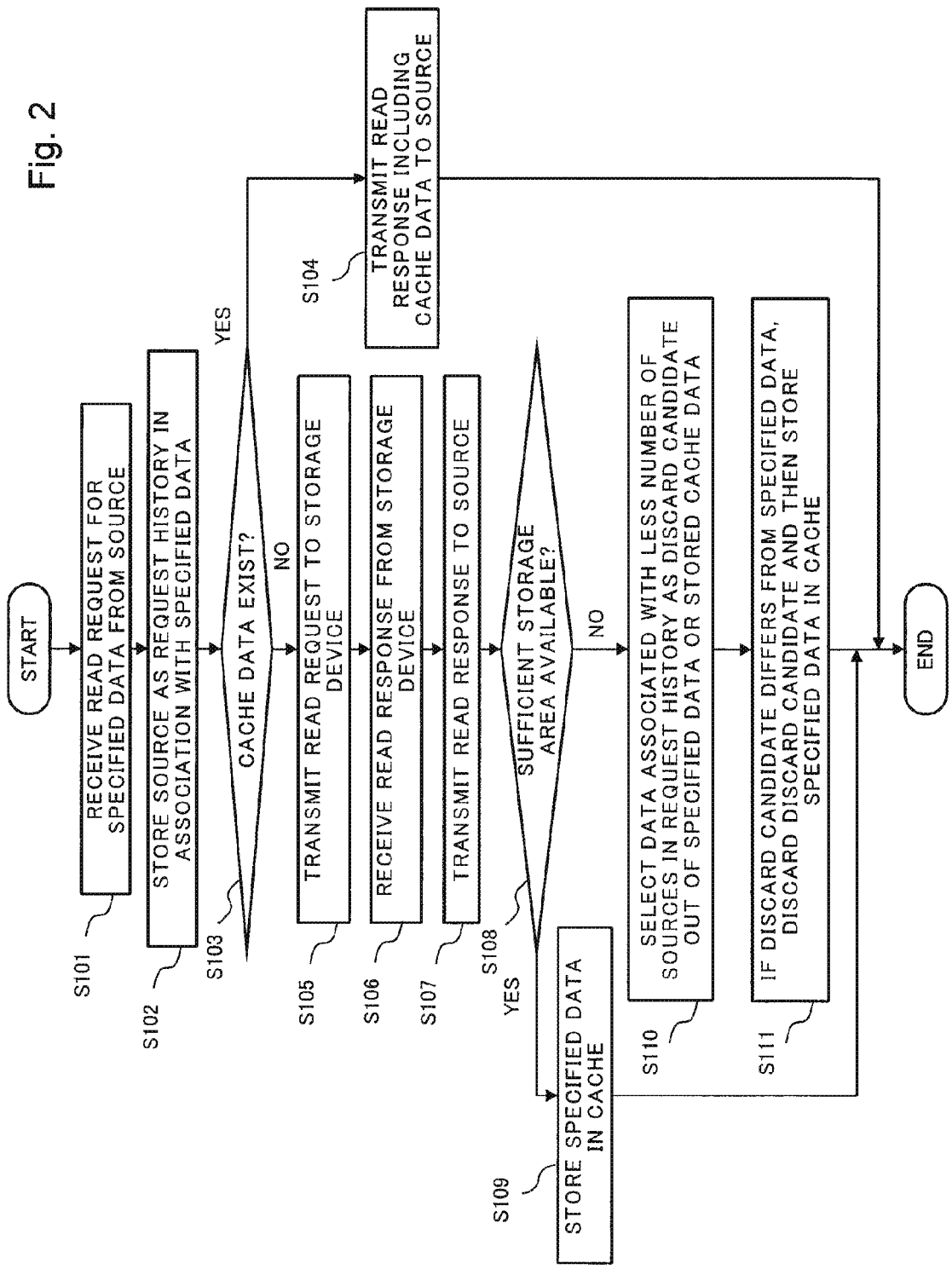

Fig. 3A

TIME SERIES OF READ REQUESTS

| TIME | SPECIFIED DATA | SOURCE |
|---|---|---|
| 1 | DATA A | SOURCE A |
| 2 | DATA B | SOURCE B |
| 3 | DATA C | SOURCE A |
| 4 | DATA C | SOURCE B |
| 5 | DATA A | SOURCE A |
| 6 | DATA B | SOURCE B |
| 7 | DATA C | SOURCE A |
| 8 | DATA C | SOURCE B |

Fig. 3B

MANIPULATION OF CACHE

| TIME | CACHE DATA (CAPACITY 1) | | |
|---|---|---|---|
| | DATA A | DATA B | DATA C |
| 1 | UPDATE | | |
| 2 | | UPDATE | |
| 3 | | | UPDATE |
| 4 | | | HIT |
| 5 | RELAY | | KEEP |
| 6 | | RELAY | KEEP |
| 7 | | | HIT |
| 8 | | | HIT |

Fig. 6A

TIME SERIES OF READ REQUESTS

| TIME | SPECIFIED DATA | SOURCE |
|---|---|---|
| 1 | DATA A | SOURCE A |
| 2 | DATA B | SOURCE B |
| 3 | DATA A | SOURCE A |
| 4 | DATA B | SOURCE B |
| 5 | DATA C | SOURCE A |
| 6 | DATA C | SOURCE B |
| 7 | DATA A | SOURCE A |
| 8 | DATA B | SOURCE B |
| 9 | DATA A | SOURCE A |
| 10 | DATA B | SOURCE B |
| 11 | DATA C | SOURCE A |
| 12 | DATA C | SOURCE B |

Fig. 6B

MANIPULATION OF SECONDARY
CACHE ON SOURCE A SIDE

| TIME | SECONDARY CACHE DATA (CAPACITY 1) | | |
|---|---|---|---|
| | DATA A | DATA B | DATA C |
| 1 | UPDATE | | |
| 2 | KEEP | | |
| 3 | HIT | | |
| 4 | KEEP | | |
| 5 | KEEP | | RELAY |
| 6 | KEEP | | |
| 7 | HIT | | |
| 8 | KEEP | | |
| 9 | HIT | | |
| 10 | KEEP | | |
| 11 | KEEP | | RELAY |
| 12 | KEEP | | |

Fig. 6C

MANIPULATION OF SECONDARY
CACHE ON SOURCE B SIDE

| TIME | SECONDARY CACHE DATA (CAPACITY 1) | | |
|---|---|---|---|
| | DATA A | DATA B | DATA C |
| 1 | | | |
| 2 | | UPDATE | |
| 3 | | KEEP | |
| 4 | | HIT | |
| 5 | | KEEP | |
| 6 | | KEEP | RELAY |
| 7 | | KEEP | |
| 8 | | HIT | |
| 9 | | KEEP | |
| 10 | | HIT | |
| 11 | | KEEP | |
| 12 | | KEEP | RELAY |

Fig. 6D

MANIPULATION OF CACHE

| TIME | CACHE DATA (CAPACITY 1) | | |
|---|---|---|---|
| | DATA A | DATA B | DATA C |
| 1 | UPDATE | | |
| 2 | | UPDATE | |
| 3 | | KEEP | |
| 4 | | KEEP | |
| 5 | | | UPDATE |
| 6 | | | HIT |
| 7 | | | KEEP |
| 8 | | | KEEP |
| 9 | | | KEEP |
| 10 | | | KEEP |
| 11 | | | HIT |
| 12 | | | HIT |

OPERATION OF CACHE DEVICE

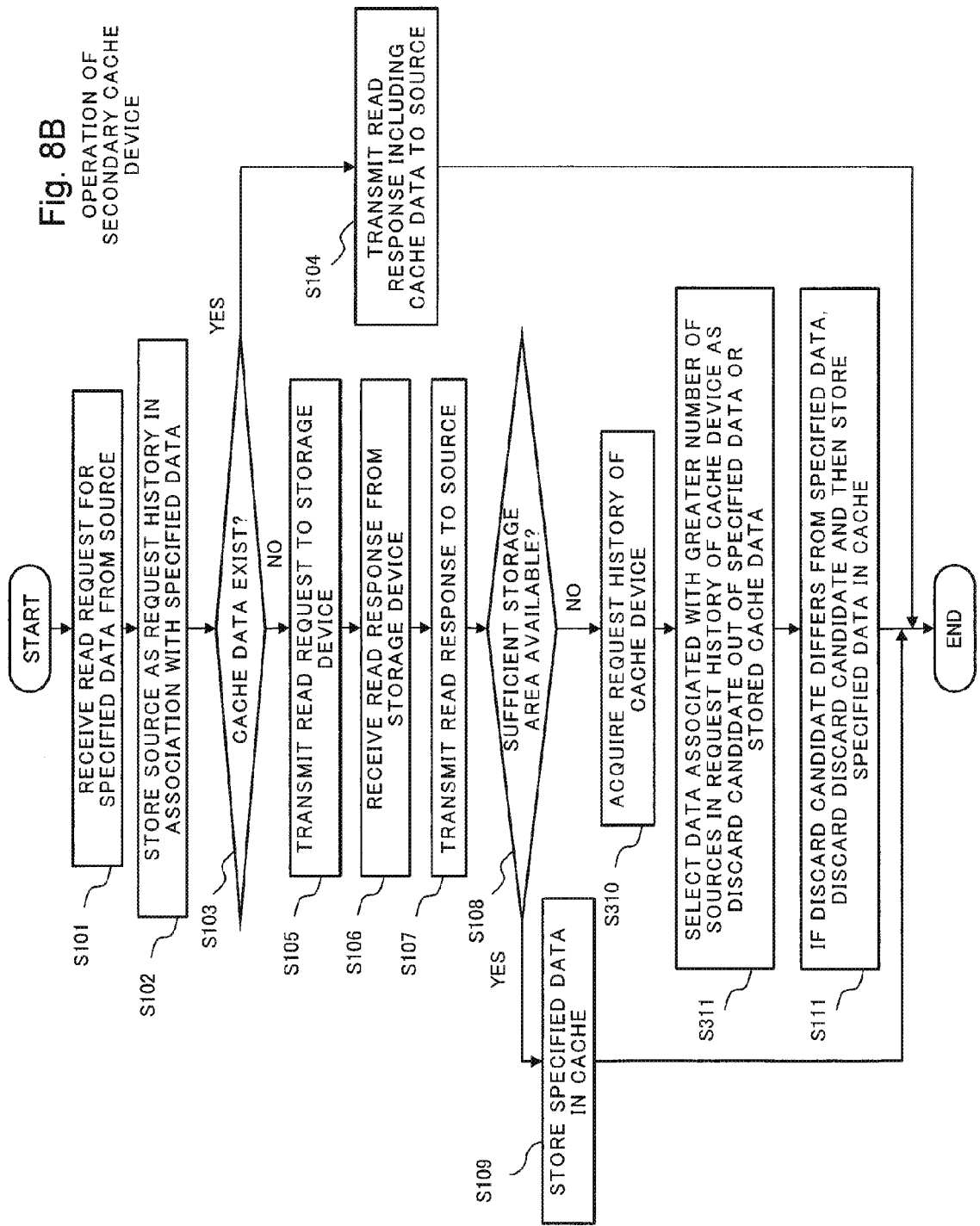

Fig. 9A

TIME SERIES OF READ REQUESTS

| TIME | SPECIFIED DATA | SOURCE |
|---|---|---|
| 1 | DATA A | SOURCE A |
| 2 | DATA B | SOURCE B |
| 3 | DATA C | SOURCE A |
| 4 | DATA C | SOURCE B |
| 5 | DATA A | SOURCE A |
| 6 | DATA B | SOURCE B |
| 7 | DATA C | SOURCE A |
| 8 | DATA C | SOURCE B |

Fig. 9B

MANIPULATION OF SECONDARY
CACHE ON SOURCE A SIDE

| TIME | SECONDARY CACHE DATA (CAPACITY 1) | | |
|---|---|---|---|
| | DATA A | DATA B | DATA C |
| 1 | UPDATE | | |
| 2 | KEEP | | |
| 3 | KEEP | | RELAY |
| 4 | KEEP | | |
| 5 | HIT | | |
| 6 | KEEP | | |
| 7 | KEEP | | RELAY |
| 8 | KEEP | | |

Fig. 9C

MANIPULATION OF SECONDARY
CACHE ON SOURCE B SIDE

| TIME | SECONDARY CACHE DATA (CAPACITY 1) | | |
|---|---|---|---|
| | DATA A | DATA B | DATA C |
| 1 | | | |
| 2 | | UPDATE | |
| 3 | | KEEP | |
| 4 | | KEEP | RELAY |
| 5 | | KEEP | |
| 6 | | HIT | |
| 7 | | KEEP | |
| 8 | | KEEP | RELAY |

Fig. 9D

MANIPULATION OF CACHE

| TIME | CACHE DATA (CAPACITY 1) | | |
|---|---|---|---|
| | DATA A | DATA B | DATA C |
| 1 | UPDATE | | |
| 2 | | UPDATE | |
| 3 | | | UPDATE |
| 4 | | | HIT |
| 5 | | | KEEP |
| 6 | | | KEEP |
| 7 | | | HIT |
| 8 | | | HIT |

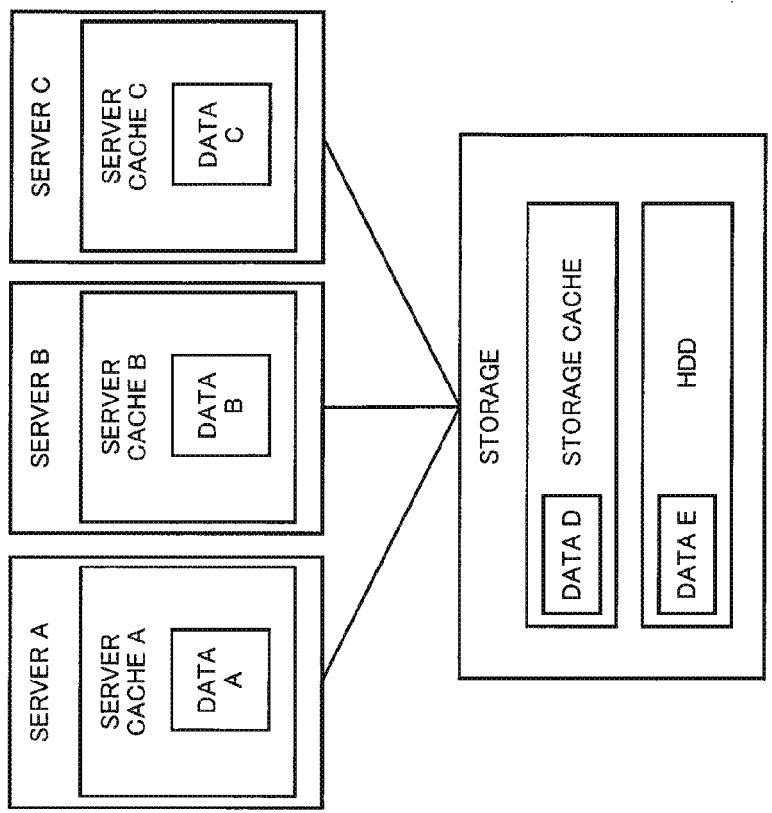
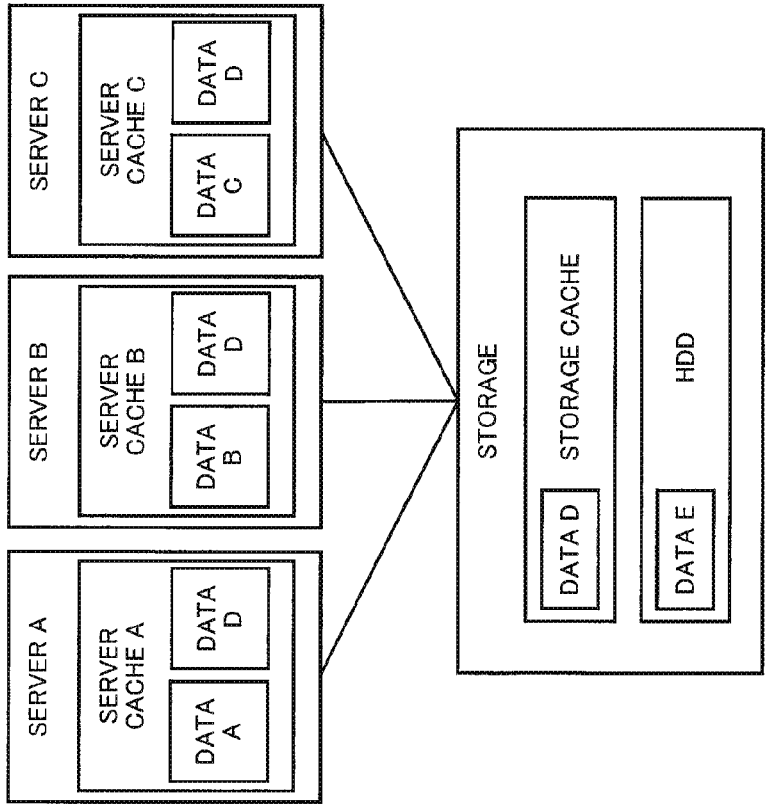

CACHE DEVICE, CACHE SYSTEM, AND CACHE METHOD

This application is based upon and claims the benefit of priority from Japanese Patent Application No. 2014-250580, filed on Dec. 11, 2014, the disclosure of which is incorporated herein in its entirety by reference.

TECHNICAL FIELD

The present invention relates to a cache device, a cache system, and a cache method that improve a hit rate of cached data.

BACKGROUND ART

Many devices that read data use a "cache" technology that avoids unnecessary readout of data from a low-speed storage device each time and speeds up data readout by temporarily retaining frequently-used data in a high-speed storage device. The "cache" technology is also often used for writing data. Further, a high-speed storage device used for a "cache" and replicated data may also be called "cache." In recent years, a technology for enhancing functionality of or increasing performance of a cache has been developed.

An example of a technology for increasing performance of a cache is disclosed in PTL 1.

A storage subsystem of PTL 1 reduces an influence of write time to a slow storage device on write time to a fast storage device by providing separate write caches for different write speeds for storage devices with different write speeds.

As a result of the operation described above, in the storage subsystem of PTL 1, data write processing does not stagnate even if there is a difference in data write speed from a cache to each storage device.

Another example of a technology for increasing performance of a cache is disclosed in PTL 2.

A printed document processing system of PTL 2 outputs image data output from a plurality of raster image generation units to a printer while retaining the data in a cache. The printed document processing system determines whether or not to retain image data in the cache if remaining capacity of the cache is low by use of an image data score. The image data score is determined by type or complexity of objects, or load, required time, data size, necessity for color space conversion, enlargement factor, existence of rotation, existence of gradation process, or an accumulated cache inquiry frequency, in generation of a raster image, or the like.

As a result of the operation described above, the printed document processing system of PTL 2 properly judges whether or not data are retained in the cache based on the image data score being properly defined.

In case that a server reads data from a storage, the server and the storage may respectively include a cache. The cache on the server side is referred to as "server cache" and the cache on the storage side is referred to as "storage cache."

In a configuration including both a server cache and a storage cache, data read by the server are temporarily retained in both the server cache and the storage cache. Therefore, there may be a case in which a piece of data exists in both the server cache and the storage cache. However, the data on the storage cache are not referred to until the data on the server cache are erased, and therefore it is possible that a situation that the storage cache is unnecessarily occupied occurs.

In a case of data being data read only by one particular server (hereinafter referred to as "independent data"), it is not until data on a server cache in the particular server are erased that the corresponding data on a storage cache are read. On the other hand, in a case of data being data read by a plurality of servers (hereinafter referred to as "shared data"), if data on a server cache in at least one server of the plurality of servers are erased, the corresponding data on a storage cache are read. Therefore, in the storage cache, a hit rate can be improved within a limited cache area by retaining shared data that are more likely to be read rather than retaining independent data that are less likely to be read.

An example of a technology for increasing performance of a cache by separately handling independent data and shared data is disclosed in PTL 3.

In a disk array device of PTL 3, a cache in a shared disk is placed in a shared cache in a disk interface unit and a cache in an exclusive disk is placed in an exclusive cache in a host interface unit.

As a result of the operation described above, in the disk array device of PTL 3, performance of the disk array device is not degraded in case that a host interface unit and a disk interface unit are added.

Another example of a technology for increasing performance of a cache by separately handling independent data and shared data is disclosed in PTL 4.

In a multi-core processor system of PTL 4, a shared cache controller distinguishes whether a variable is shared data shared between threads or non-shared data not shared between threads, in accordance with a program code. The shared cache controller retains shared data in a shared memory into a shared cache memory and non-shared data in a shared memory into a distributed cache.

As a result of the operation described above, the multi-core processor system of PTL 4 efficiently utilizes an area in the shared cache memory.

CITATION LIST

Patent Literature

[PTL 1] Japanese Unexamined Patent Application Publication No. 2010-049502
[PTL 2] Japanese Unexamined Patent Application Publication No. 2012-118745
[PTL 3] Japanese Unexamined Patent Application Publication No. 2007-206949
[PTL 4] WO2011/161829

SUMMARY

Technical Problem

In the technologies of PTL 3 and 4, independent data and shared data are distinguished prior to cache operation by performing setting, analysis, and the like in advance. Therefore, there is a problem in the technologies of PTL 3 and 4 that dynamic distinction between independent data and shared data cannot be performed while the cache is in operation.

OBJECT OF INVENTION

A main object of the present invention is to provide a cache device, a cache system, and a cache method capable of dynamically distinguishing between independent data and shared data and preferentially retaining shared data in a cache while the cache is in operation.

Solution to Problem

A cache device of the present invention is a cache device connected to a storage device and connected to a plurality of sources and includes a cache unit that receives a first read request from a first of the sources, and, if not retaining first data specified in the first read request, transmits the first read request to the storage device, receives a first read response from the storage device, and transmits the first read response to the first source, and meanwhile, if retaining the first data, transmits a second read response including the first data to the first source, and a storage area control unit that stores the first source as a first history in association with specification of the first data, and, if the first data are not retained by the cache unit and a storage area sufficient for retaining the first data exists in the cache unit, causes the cache unit to store the first data, and meanwhile, if the first data are not retained by the cache unit and a storage area sufficient for retaining the first data does not exist in the cache unit, selects data associated with a less number of the sources in the first history as second data in preference to data associated with a greater number of the sources in the first history out of the first data or data retained in the cache unit, and, if the second data differ from the first data, causes the cache unit to discard the second data and then store the first data.

A cache system of the present invention is a cache system including a cache device connected to a storage device and a plurality of secondary cache devices connected to the storage device via the cache device, each of the secondary cache devices connected to one source, wherein the cache device includes a cache unit that receives a first read request from a first source via the secondary cache device, and, if not retaining first data specified in the first read request, transmits the first read request to the storage device, receives a first read response from the storage device, and transmits the first read response to the first source via the secondary cache device, and meanwhile, if retaining the first data, transmits a second read response including the first data to the first source via the secondary cache device, and a storage area control unit that stores the first source as a first history in association with specification of the first data, and, if the first data are not retained by the cache unit and a storage area sufficient for retaining the first data exists in the cache unit, causes the cache unit to store the first data, and meanwhile, if the first data are not retained by the cache unit and a storage area sufficient for retaining the first data does not exist in the cache unit, selects data associated with a less number of the sources in the first history as second data in preference to data associated with a greater number of the sources in the first history out of the first data or data retained in the cache unit, and, if the second data differ from the first data, causes the cache unit to discard the second data and then store the first data, and the secondary cache device includes a secondary cache unit that receives a second read request from the first source, and, if not retaining third data specified in the second read request, transmits the second read request to the storage device via the cache device, receives a third read response from the storage device via the cache device, and transmits the third read response to the first source, and meanwhile, if retaining the third data, transmits a fourth read response including the third data to the first source, and a secondary storage area control unit that, if the third data are not retained and a storage area sufficient for retaining the third data exists, stores the third data, and meanwhile, if the third data are not retained and a storage area sufficient for retaining the third data does not exist, acquires information about the first history from the cache device and selects data associated with a greater number of the sources in the first history as fourth data in preference to data associated with a less number of the sources in the first history out of the third data or retained data, and, if the fourth data differ from the third data, discards the fourth data and then stores the third data.

A cache method of the present invention is a cache method in a cache device connected to a storage device and connected to a plurality of sources, the cache method including, receiving a first read request from a first of the sources, and, if not retaining first data specified in the first read request, transmitting the first read request to the storage device, receiving a first read response from the storage device, and transmitting the first read response to the first source, and meanwhile, if retaining the first data, transmitting a second read response including the first data to the first source, and storing the first source as a first history in association with specification of the first data, and, if the first data are not retained and a storage area sufficient for retaining the first data exists, storing the first data, and meanwhile, if the first data are not retained and a storage area sufficient for retaining the first data does not exist, selecting data associated with a less number of the sources in the first history as second data in preference to data associated with a greater number of the sources in the first history out of the first data or retained data, and, if the second data differ from the first data, discarding the second data and then storing the first data.

Advantageous Effects of Invention

The present invention is effective in dynamically distinguishing between independent data and shared data and preferentially retaining shared data in a cache while the cache is in operation.

BRIEF DESCRIPTION OF THE DRAWINGS

FIG. 1 is a block diagram illustrating an example of a configuration of a cache device 100 according to a first exemplary embodiment of the present invention.

FIG. 2 is a flowchart illustrating an operation of the cache device 100 according to the first exemplary embodiment of the present invention.

FIG. 3A illustrates a time series of data read requests according to the first exemplary embodiment of the present invention.

FIG. 3B illustrates manipulations of cache data according to the first exemplary embodiment of the present invention.

FIG. 6A illustrates a time series of data read requests according to the second exemplary embodiment of the present invention.

FIG. 6B illustrates manipulations of cache data according to the second exemplary embodiment of the present invention.

FIG. 6C illustrates manipulations of cache data according to the second exemplary embodiment of the present invention.

FIG. 6D illustrates manipulations of cache data according to the second exemplary embodiment of the present invention.

FIG. 8B is a flowchart illustrating operations of the secondary cache devices according to the third exemplary embodiment of the present invention.

FIG. 9A illustrates a time series of data read requests according to the third exemplary embodiment of the present invention.

FIG. 9B illustrates manipulations of cache data by the secondary cache device according to the third exemplary embodiment of the present invention.

FIG. 9C illustrates manipulations of cache data by the secondary cache device according to the third exemplary embodiment of the present invention.

FIG. 9D illustrates manipulations of cache data by the cache device according to the third exemplary embodiment of the present invention.

FIG. 14A is a diagram illustrating an example of cache data placement according to the fourth exemplary embodiment of the present invention.

FIG. 14B is a diagram illustrating an example of cache data placement according to the fifth exemplary embodiment of the present invention.

EXEMPLARY EMBODIMENT

Figure 4:
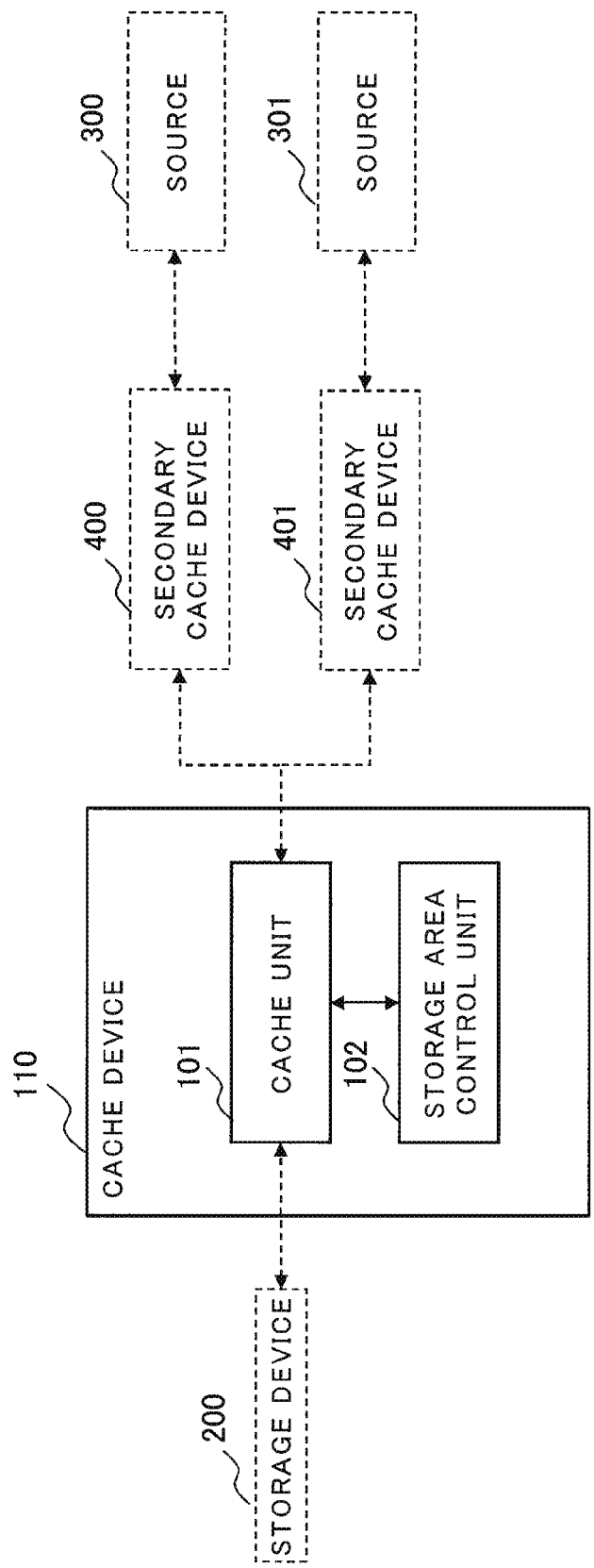
FIG. 4 is a block diagram illustrating an example of a configuration of a cache device 110 according to a second exemplary embodiment of the present invention.

Exemplary embodiments of the present invention will be described in detail below with reference to the drawings. A same reference sign is given to a similar component in the drawings, thus omitting description thereof accordingly.

First Exemplary Embodiment

First, a configuration according to the present exemplary embodiment will be described. FIG. 1 is a block diagram illustrating an example of a configuration of a cache device 100 according to the first exemplary embodiment of the present invention.

The cache device 100 according to the present exemplary embodiment is connected to a storage device 200 and sources 300 and 301. The cache device 100 includes a cache unit 101 and a storage area control unit 102. The cache device 100 may be connected to a plurality of storage devices and may be connected to three or more sources.

The cache unit 101 first receives a read request for data from the source 300.

Next, if not retaining specified data specified in the read request, the cache unit 101 transmits a read request to the storage device 200, receives a response to the read request (read response) from the storage device 200, and transmits the read response to the source 300. On the other hand, if retaining specified data specified in the read request, the cache unit 101 transmits a read response including the retained specified data to the source 300.

The cache unit 101 has a predetermined upper limit (cache capacity) that sets an amount of retainable cache data. Cache capacity is defined by use of the total number of bytes of retainable cache data. Alternatively, cache capacity may be defined by use of an upper limit of the number of blocks of a memory area used for storing specified data, an upper limit of number of retainable specified data, or the like.

The cache unit 101 operates with the source 301 in the same way as with the source 300.

The storage area control unit 102 first stores the source 300 in a history in association with "specification" of specified data in a read request. The aforementioned history held by the storage area control unit 102 in the cache device 100 is hereinafter called "request history." The "specification" of specified data refers to any information that specifies specified data. The specification of specified data includes, for example, a data identifier, a file name, a set of a starting address and an ending address, a set of a starting address and a length of data, a storage device identifier, or a combination thereof. In a request history, the source 300 is specified by use of any information that specifies a source such as a source identifier and a network address.

The storage area control unit 102 may retain only a predetermined number of latest elements as request history elements. The storage area control unit 102 may also store a source and a request frequency of specification of particular specified data as a request history.

Next, if specified data are not retained by the cache unit 101 and a storage area sufficient for retaining the aforementioned specified data exists in the cache unit 101, the storage area control unit 102 causes the cache unit 101 to store the specified data. On the other hand, if specified data are not retained by the cache unit 101 and a storage area sufficient for retaining the specified data does not exist in the cache unit 101, the storage area control unit 102 determines discard candidate data. Specifically, the storage area control unit 102 selects data associated with a less number of sources in the request history as discard candidate data in preference to data associated with a greater number of sources out of the specified data or data retained in the cache unit 101. Then, if the selected discard candidate data differ from the specified data, the storage area control unit 102 causes the cache unit 101 to discard the discard candidate data and then store the specified data.

The storage area control unit 102 may refer to only a predetermined number of latest elements out of request history elements. If a plurality of cache data or specified data associated with the least number of sources exists, the storage area control unit 102 may select any of the cache data or the specified data as a discard candidate. The cache device 100, for example, selects cache data corresponding to the earliest read request as a discard candidate out of the data.

The storage area control unit 102 operates with the source 301 in the same way as with the source 300.

The storage device 200 retains original data of cache data. The storage device 200 is, for example, a memory, an SSD (Solid State Drive), a hard disk, a disk array, a database, or a server.

The sources 300 and 301 read data retained by the storage device 200. The sources 300 and 301 include, for example, a server, a terminal, a CPU (Central Processing Unit), each core in a multi-core CPU, each thread in a multithread-capable CPU.

Next, an operation according to the present exemplary embodiment will be described.

FIG. 2 is a flowchart illustrating an operation of the cache device 100 according to the first exemplary embodiment of the present invention. The flowchart in FIG. 2 illustrates processing of one data readout from one source. Processing for the source 300 will be described below as an example. The flowchart illustrated in FIG. 2 and the description below are an example, and process order or the like may be interchanged and processes may be returned or repeated, as appropriate depending on required processes. In case that the cache device 100 is connected to three or more sources, the cache device 100 operates in the same way as described below.

The cache unit 101 receives a read request for particular data from the source 300 (Step S101).

The storage area control unit 102 stores the source 300 as a request history in association with specification of specified data in the read request (Step S102).

The storage area control unit 102 determines whether or not the specified data are retained by the cache unit 101 (Step S103).

If the specified data are retained by the cache unit 101 (Step S103: Yes), the cache unit 101 transmits a read response including the retained specified data to the source 300 (Step S104) and ends the process.

If the specified data are not retained by the cache unit 101 (Step S103: No), the cache unit 101 transmits a read request to the storage device 200 (Step S105) and proceeds to a process in Step S106. The cache unit 101 receives a read response from the storage device 200 (Step S106), transmits the read response to the source 300 (Step S107), and proceeds to a process in Step S108.

The storage area control unit 102 determines whether or not a storage area sufficient for retaining the aforementioned specified data exists in the cache unit 101 (Step S108).

If a storage area sufficient for retaining the aforementioned specified data exists in the cache unit 101 (Step S108: Yes), the storage area control unit 102 causes the cache unit 101 to store the specified data (Step S109) and ends the process.

If a storage area sufficient for retaining the aforementioned specified data does not exist in the cache unit 101 (Step S108: No), the storage area control unit 102 selects data associated with a less number of sources in the request history as discard candidate data in preference to data associated with a greater number of sources out of the specified data or data retained in the cache unit 101 (Step S110) and proceeds to a process in Step S111. If the selected discard candidate data differ from the specified data, the storage area control unit 102 causes the cache unit 101 to discard the discard candidate data and then store the specified data (Step S111) and ends the process. The aforementioned number of sources represents the number of sources that request particular data in the request history. For example, if particular data are requested three times by the source 300 and four times by the source 301, the aforementioned number of sources is 2.

Next, a specific example of processing according to the present exemplary embodiment will be described.

FIGS. 3A and 3B are diagrams for describing a specific example of an operation of the cache device 100 according to the first exemplary embodiment of the present invention.

FIG. 3A illustrates a time series of data read requests from the sources 300 and 301. The first element indicates that there is a read request for specified data "data A" from a source "source A" (source 300) at a time "1." The second element indicates that there is a read request for specified data "data B" from a source "source B" (source 301) at a time "2." The third element indicates that there is a read request for specified data "data C" from the source "source A" at a time "3." The fourth element indicates that there is a read request for the specified data "data C" from the source "source B" at a time "4." The fifth to eighth elements indicate that the read requests at the times "1" to "4" are repeated at times "5" to "8," respectively.

In other words, the "data A" are independent data requested only by the source "source A." Further, the "data B" are independent data requested only by the source "source B." On the other hand, the "data C" are shared data requested by both the source "source A" and the source "source B."

FIG. 3B illustrates manipulations of cache data by the cache device 100. The first column denotes time. The second column, the third column, and the fourth column respectively indicate a manipulation of specified data "data A", specified data "data B", and specified data "data C" by the cache device 100. A manipulation "update" represents relaying a data read request and a data read response to/from the storage device 200 and updating cache data with data in the data read response. A manipulation "hit" represents transmitting a data read response by use of retained cache data. A manipulation "keep" represents not changing cache data. A manipulation "relay" represents relaying a data read request and a data read response to/from the storage device 200 but not updating cache data. In FIG. 3B, cache capacity of the cache unit 101 amounts to one piece of specified data. Further, it is assumed that the cache is empty prior to the time "1."

Time "1")

The cache device 100 receives a read request for specified data "data A" from a source "source A" (Step S101). Then, the cache device 100 records the source in a request history (Step S102). Since cache data for the specified data "data A" do not exist (Step S103: No), the cache device 100 acquires the specified data "data A" from the storage device 200 (Steps S105 and S106) and transmits the data to the source "source A" (Step S107). Since a free area required for a cache is available (Step S108: Yes), the cache device 100 stores the specified data "data A" in the cache (Step S109).

Time "2")

The cache device 100 receives a read request for specified data "data B" from a source "source B" (Step S101). Then, the cache device 100 records the source in the request history (Step S102). Since cache data for the specified data "data B" do not exist (Step S103: No), the cache device 100 acquires the specified data "data B" from the storage device 200 (Steps S105 and S106) and transmits the data to the source "source B" (Step S107). Since a free area required for a cache is not available (Step S108: No), the cache device 100 selects the data "data A" associated with one source "source A" as a discard candidate (Step S110) and updates the selected discard candidate "data A" with the specified data "data B" (Step S111). In this operation example, if a plurality of cache data or specified data associated with the least number of sources exists, the cache device 100 selects cache data corresponding to the earliest read request as a discard candidate.

Time "3")

The cache device 100 receives a read request for specified data "data C" from the source "source A" (Step S101). Then, the cache device 100 records the source in the request history (Step S102). Since cache data for the specified data "data C" do not exist (Step S103: No), the cache device 100 acquires the specified data "data C" from the storage device 200 (Steps S105 and S106) and transmits the data to the source "source A" (Step S107). Since a free area required for a cache is not available (Step S108: No), the cache device 100 selects the data "data B" associated with the source "source B" as a discard candidate (Step S110) and updates the selected discard candidate "data B" with the specified data "data C" (Step S111).

Time "4")

The cache device 100 receives a read request for the specified data "data C" from the source "source B" (Step S101). Then, the cache device 100 records the source in the request history (Step S102). Since cache data for the specified data "data C" exist (Step S103: Yes), the cache device 100 transmits a read response including the cache data "data C" to the source "source B" (Step S104).

Time "5")

The cache device 100 receives a read request for the specified data "data A" from the source "source A" (Step S101). Then, the cache device 100 records the source in the request history (Step S102). Since cache data for the specified data "data A" do not exist (Step S103: No), the cache device 100 acquires the specified data "data A" from the storage device 200 (Steps S105 and S106) and transmits the data to the source "source A" (Step S107). Since a free area required for a cache is not available (Step S108: No), the cache device 100 selects the data "data A" associated with one source "source A" as a discard candidate (Step S110). Then, since the selected discard candidate "data A" and the specified data "data A" are the same, the cache device 100 ends the process (Step S111).

Time "6")

The cache device 100 receives a read request for the specified data "data B" from the source "source B" (Step S101). Then, the cache device 100 records the source in the request history (Step S102). Since cache data for the specified data "data B" do not exist (Step S103: No), the cache device 100 acquires the specified data "data B" from the storage device 200 (Steps S105 and S106) and transmits the data to the source "source B" (Step S107). Since a free area required for a cache is not available (Step S108: No), the cache device 100 selects the data "data B" associated with one source "source B" as a discard candidate (Step S110). Then, since the selected discard candidate "data B" and the specified data "data B" are the same, the cache device 100 ends the process (Step S111).

Time "7")

The cache device 100 receives a read request for the specified data "data C" from the source "source A" (Step S101). Then, the cache device 100 records the source in the request history (Step S102). Since cache data for the specified data "data C" exist (Step S103: Yes), the cache device 100 transmits a read response including the cache data "data C" to the source "source A" (Step S104).

Time "8")

The cache device 100 receives a read request for the specified data "data C" from the source "source B" (Step S101). Then, the cache device 100 records the source in the request history (Step S102). Since cache data for the specified data "data C" exist (Step S103: Yes), the cache device 100 transmits a read response including the cache data "data C" to the source "source B" (Step S104).

As described above, the cache device 100 according to the present exemplary embodiment retains shared data in a cache in preference to independent data. In particular, if cache capacity is sufficient for retaining entire shared data, the cache device 100 retains entire read shared data in the cache. Further, the cache device 100 dynamically judges whether or not specified data are shared data while the cache is in operation, in accordance with a request history. Therefore, the cache device 100 according to the present exemplary embodiment is capable of dynamically distinguishing between independent data and shared data and preferentially retaining shared data in the cache while the cache is in operation.

In the cache device 100 according to the present exemplary embodiment, shared data are retained in a cache in preference to independent data, and therefore a hit rate of a cache is particularly high if a ratio of read requests for shared data to read requests for independent data is high.

Second Exemplary Embodiment

Next, a second exemplary embodiment of the present invention in which a cache device is connected to a source via a secondary cache device in the aforementioned first exemplary embodiment will be described. In the following description, a same reference sign is given to a similar component described in the aforementioned first exemplary embodiment, thus omitting description thereof accordingly.

First, a configuration according to the present exemplary embodiment will be described.

FIG. 4 is a block diagram illustrating an example of a configuration of a cache device 110 according to the second exemplary embodiment of the present invention.

The cache device 110 according to the present exemplary embodiment is connected to a source 300 via a secondary cache device 400. Further, the cache device 110 is connected to a source 301 via a secondary cache device 401. A configuration of the cache device 110 according to the present exemplary embodiment is the same as the configuration of the cache device 100 according to the first exemplary embodiment.

The secondary cache devices 400 and 401 are general cache devices. The secondary cache devices 400 and 401 relay a data read request from the sources 300 and 301, respectively, to a storage device 200 via the cache device 110. When relaying a data read request, the secondary cache devices 400 and 401 retain relayed read data in an internal cache, respectively. The secondary cache devices 400 and 401 preferentially discard cache data with low read frequency if cache data exceed cache capacity.

Next, an operation according to the present exemplary embodiment will be described.

Figure 5:
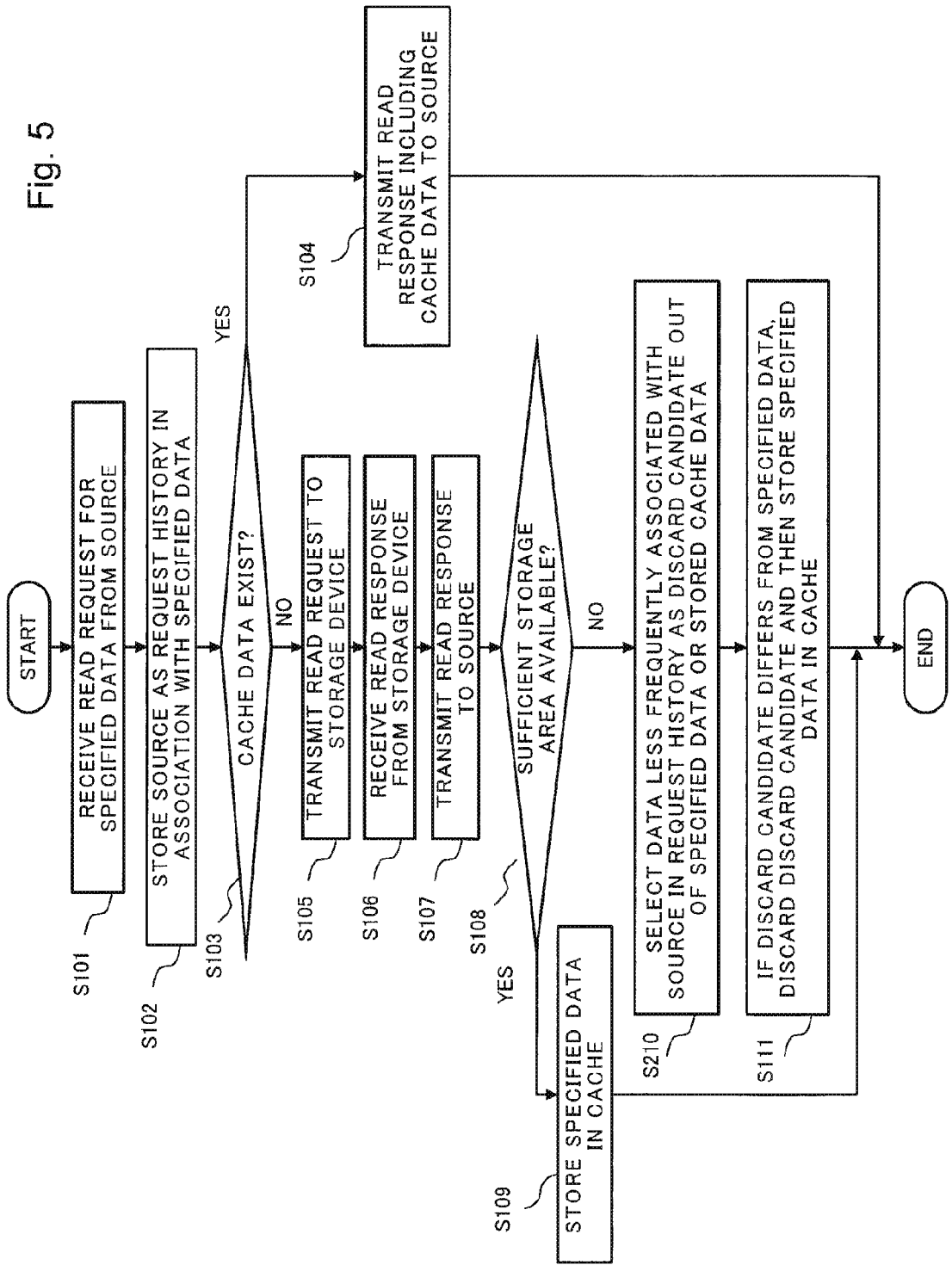
FIG. 5 is a flowchart illustrating an operation of a secondary cache device 400 according to the second exemplary embodiment of the present invention.

FIG. 5 is a flowchart illustrating an operation of the secondary cache devices 400 and 401 according to the second exemplary embodiment of the present invention. The flowchart in FIG. 5 illustrates processing of one data readout from one source. Processing for the source 300 by the secondary cache device 400 will be described below as an example. The flowchart illustrated in FIG. 5 and the description below are an example, and process order or the like may be interchanged and processes may be returned or repeated, as appropriate depending on required processes.

An operation of the cache device 110 according to the present exemplary embodiment is the same as the operation of the cache device 100 according to the first exemplary embodiment.

An operation of the secondary cache device 400 according to the present exemplary embodiment is the same as the operation of the cache device 100 according to the first exemplary embodiment except that the process in Step S110 is replaced by a process in Step S210.

The secondary cache device 400 selects data less frequently associated with the source in the request history as discard candidate data in preference to data more frequently associated with the source out of the specified data or data retained in the cache (Step S210) and proceeds to a process in Step S111. The aforementioned frequency represents an accumulated frequency of particular data being requested by a source in a request history. For example, if particular data are requested by the source 300 twice, the aforementioned frequency is 2.

If a plurality of cache data or specified data least frequently associated with the source exist, the secondary cache device 400 may select any of the cache data or the specified data as a discard candidate. The secondary cache device 400, for example, selects cache data corresponding to the earliest read request as a discard candidate out of the data.

Next, a specific example of processing according to the present exemplary embodiment will be described.

FIGS. 6A-6D are diagrams for describing a specific example of operations of the cache device 110 and the secondary cache devices 400 and 401 according to the second exemplary embodiment of the present invention.

FIG. 6A illustrates a time series of data read requests from the sources 300 and 301. The first element indicates that there is a read request for specified data "data A" from a source "source A" at a time "1." The second element indicates that there is a read request for specified data "data B" from a source "source B" at a time "2." The third and fourth elements indicate that the read requests at the times "1" and "2" are respectively repeated at times "3" and "4." The fifth element indicates that there is a read request for specified data "data C" from the source "source A" at a time "5." The sixth element indicates that there is a read request for the specified data "data C" from the source "source B" at a time "6." The seventh to twelfth elements indicate that the read requests at the times "1" to "6" are respectively repeated at times "7" to "12."

In other words, the "data A" are independent data requested only by the source "source A." Further, the "data B" are independent data requested only by the source "source B." On the other hand, the "data C" are shared data requested by both the source "source A" and the source "source B."

FIG. 6B illustrates manipulations of cache data by the secondary cache device 400. A prerequisite and a description method of a manipulation are the same as the prerequisite and the description method in FIG. 3B.

FIG. 6C illustrates manipulations of cache data by the secondary cache device 401. A prerequisite and a description method of a manipulation are the same as the prerequisite and the description method in FIG. 3B.

FIG. 6D illustrates manipulations of cache data by the cache device 110. A prerequisite and a description method of a manipulation are the same as the prerequisite and the description method in FIG. 3B.

Time "1")

The secondary cache device 400 receives a read request for specified data "data A" from a source "source A" (Step S101). Then, the secondary cache device 400 records the source in a request history (Step S102). Since cache data for the specified data "data A" do not exist (Step S103: No), the secondary cache device 400 acquires the specified data "data A" from the storage device 200 via the cache device 110 (Steps S105 and S106) and transmits the data to the source "source A" (Step S107). Since a free area required for a cache is available (Step S108: Yes), the secondary cache device 400 stores the specified data "data A" in the cache (Step S109).

The cache device 110 receives a read request for the specified data "data A" from the source "source A" via the secondary cache device 400 (Step S101). Then, the cache device 110 records the source in the request history (Step S102). Since cache data for the specified data "data A" do not exist (Step S103: No), the cache device 110 acquires the specified data "data A" from the storage device 200 (Steps S105 and S106) and transmits the data to the source "source A" via the secondary cache device 400 (Step S107). Since a free area for a cache is available (Step S108: Yes), the cache device 110 stores the specified data "data A" in the cache (Step S109).

Time "2")

The secondary cache device 401 receives a read request for specified data "data B" from a source "source B" (Step S101). Then, the secondary cache device 401 records the source in the request history (Step S102). Since cache data for the specified data "data B" do not exist (Step S103: No), the secondary cache device 401 acquires the specified data "data B" from the storage device 200 via the cache device 110 (Steps S105 and S106) and transmits the data to the source "source B" (Step S107). Since a free area required for a cache is available (Step S108: Yes), the secondary cache device 401 stores the specified data "data B" in the cache (Step S109).

The cache device 110 receives a read request for the specified data "data B" from the source "source B" via the secondary cache device 401 (Step S101). Then, the cache device 110 records the source in the request history (Step S102). Since cache data for the specified data "data B" do not exist (Step S103: No), the cache device 110 acquires the specified data "data B" from the storage device 200 (Steps S105 and S106) and transmits the data to the source "source B" via the secondary cache device 401 (Step S107). Since a free area required for a cache is not available (Step S108: No), the cache device 110 selects the data "data A" associated with one source "source A" as a discard candidate (Step S110) and updates the selected discard candidate "data A" with the specified data "data B" (Step S111).

Time "3")

The secondary cache device 400 receives a read request for the specified data "data A" from the source "source A" (Step S101). Then, the secondary cache device 400 records the source in the request history (Step S102). Since cache data for the specified data "data A" exist (Step S103: Yes), the secondary cache device 400 transmits a read response including the cache data "data A" to the source "source A" (Step S104).

Time "4")

The secondary cache device 401 receives a read request for the specified data "data B" from the source "source B" (Step S101). Then, the secondary cache device 401 records the source in the request history (Step S102). Since cache data for the specified data "data B" exist (Step S103: Yes), the secondary cache device 401 transmits a read response including the cache data "data B" to the source "source B" (Step S104).

Time "5")

The secondary cache device 400 receives a read request for specified data "data C" from the source "source A" (Step S101). Then, the secondary cache device 400 records the source in the request history (Step S102). Since cache data for the specified data "data C" do not exist (Step S103: No), the secondary cache device 400 acquires the specified data "data C" from the storage device 200 via the cache device 110 (Steps S105 and S106) and transmits the data to the source "source A" (Step S107). Since a free area required for a cache is not available (Step S108: No), the secondary cache device 400 selects the data "data C" associated with the source "source A" once as a discard candidate (Step S210) and discards the selected discard candidate "data C" (Step S111).

The cache device 110 receives a read request for the specified data "data C" from the source "source A" via the secondary cache device 400 (Step S101). Then, the cache device 110 records the source in the request history (Step S102). Since cache data for the specified data "data C" do not exist (Step S103: No), the cache device 110 acquires the specified data "data C" from the storage device 200 (Steps S105 and S106) and transmits the data to the source "source A" via the secondary cache device 400 (Step S107). Since a free area required for a cache is not available (Step S108: No), the cache device 110 selects the data "data B" associated with one source "source B" as a discard candidate (Step S110) and updates the selected discard candidate "data B" with the specified data "data C" (Step S111).

Time "6")

The secondary cache device 401 receives a read request for the specified data "data C" from the source "source B" (Step S101). Then, the secondary cache device 401 records the source in the request history (Step S102). Since cache data for the specified data "data C" do not exist (Step S103: No), the secondary cache device 401 acquires the specified data "data C" from the storage device 200 via the cache device 110 (Steps S105 and S106) and transmits the data to the source "source B" (Step S107). Since a free area required for a cache is not available (Step S108: No), the secondary cache device 401 selects the data "data C" associated with the source "source B" once as a discard candidate (Step S210) and discards the selected discard candidate "data C" (Step S111).

The cache device 110 receives a read request for the specified data "data C" from the source "source B" via the secondary cache device 401 (Step S101). Then, the cache device 110 records the source in the request history (Step S102). Since cache data for the specified data "data C" exist (Step S103: Yes), the cache device 110 transmits a read response including the cache data "data C" to the source "source B" via the secondary cache device 401 (Step S104).

Time "7")

The secondary cache device 400 operates in the same way as at the time "3."

Time "8")

The secondary cache device 401 operates in the same way as at the time "4."

Time "9")

The secondary cache device 400 operates in the same way as at the time "3."

Time "10")

The secondary cache device 401 operates in the same way as at the time "4."

Time "11")

The secondary cache device 400 operates in the same way as at the time "5."

The cache device 110 receives a read request for the specified data "data C" from the source "source A" via the secondary cache device 400 (Step S101). Then, the cache device 110 records the source in the request history (Step S102). Since cache data for the specified data "data C" exist (Step S103: Yes), the cache device 110 transmits a read response including the cache data "data C" to the source "source A" via the secondary cache device 400 (Step S104).

Time "12")

The secondary cache device 401 operates in the same way as at the time "6."

The cache device 110 operates in the same way as at the time "6."

As described above, the cache device 110 according to the present exemplary embodiment retains shared data in a cache in preference to independent data. In particular, if cache capacity is sufficient for retaining entire shared data, the cache device 110 retains entire read shared data in the cache. Further, the cache device 110 dynamically judges whether or not specified data are shared data while the cache is in operation, in accordance with a request history. Therefore, the cache device 110 according to the present exemplary embodiment is capable of dynamically distinguishing between independent data and shared data and preferentially retaining shared data in the cache while the cache is in operation.

The secondary cache device 400 preferentially retains data requested by the source 300 with high frequency in a cache. In particular, if cache capacity is sufficient for retaining entire data with high request frequency, the secondary cache device 400 retains entire read data with high request frequency in a cache. The secondary cache device 401 operates in the same way as the secondary cache device 400. In other words, the secondary cache devices 400 and 401 preferentially retain data with high request frequency in a cache, respectively, and the cache device 110 preferentially retains shared data in the cache. Therefore, in the cache device 110, a hit rate of a cache is particularly high if a ratio of read requests for individual independent data to read requests for individual shared data is high.

Further, if a ratio of read requests for individual independent data to read requests for individual shared data is high, the secondary cache devices 400 and 401 mainly retain a cache for data with high request frequency, respectively. On the other hand, if a ratio of read requests for individual independent data to read requests for individual shared data is high, the cache device 110 mainly retains a cache for shared data. Consequently, in the cache device 110 according to the present exemplary embodiment, overall cache utilization efficiency is improved compared with a case in which an ordinary cache device is used.

Third Exemplary Embodiment

Next, a third exemplary embodiment of the present invention in which a cache device passes request history information to a secondary cache device according to the aforementioned second exemplary embodiment will be described.

In the following description, a same reference sign is given to a similar component described in the second exemplary embodiment, thus omitting description thereof accordingly.

First, a configuration according to the present exemplary embodiment will be described.

Figure 7:
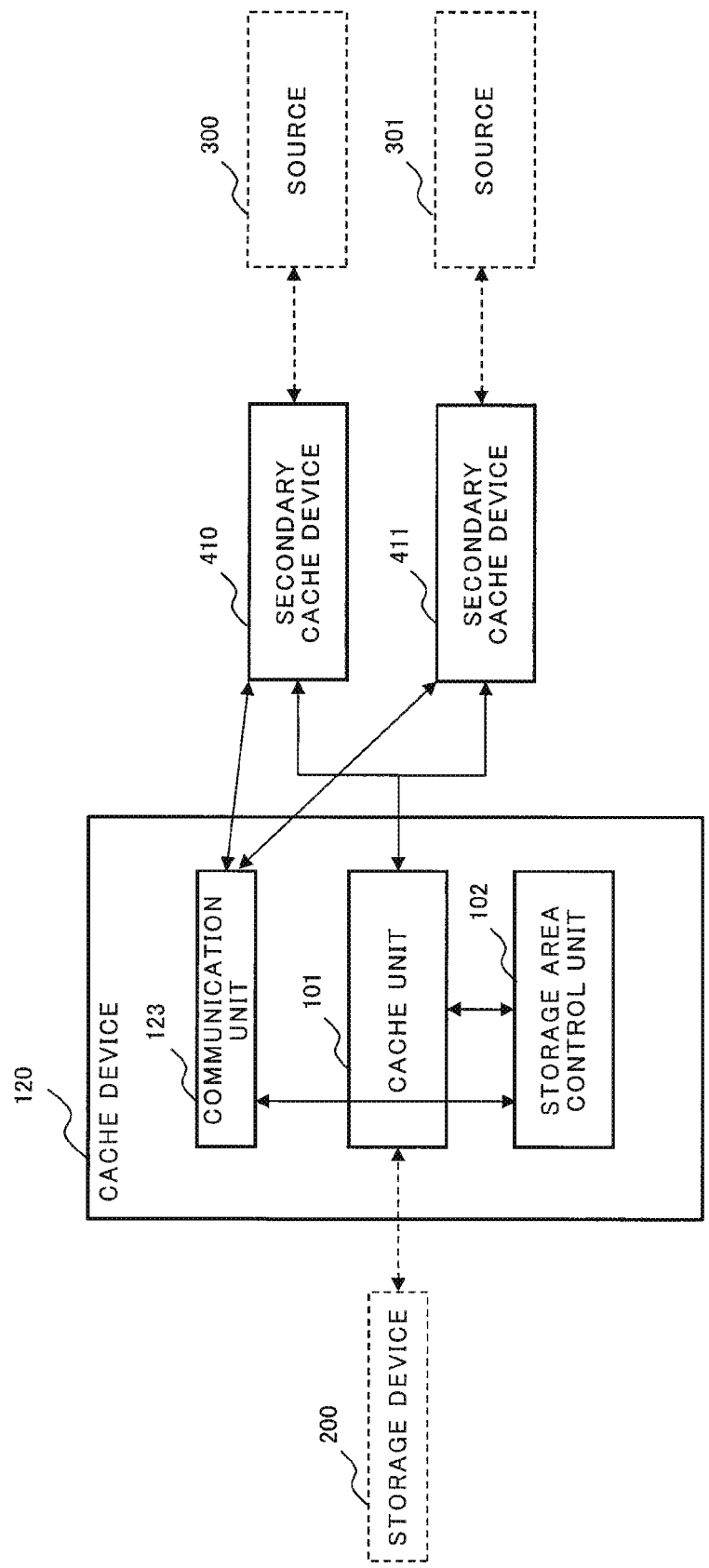
FIG. 7 is a block diagram illustrating an example of a configuration of a cache device 120 according to a third exemplary embodiment of the present invention.

FIG. 7 is a block diagram illustrating an example of a configuration of a cache device 120 according to the third exemplary embodiment of the present invention.

The cache device 120 is connected to a secondary cache device 410 instead of the secondary cache device 400 according to the second exemplary embodiment. Further, the cache device 120 is connected to a secondary cache device 411 instead of the secondary cache device 401 according to the second exemplary embodiment.

The cache device 120 according to the present exemplary embodiment includes a communication unit 123.

If request history information is requested by the secondary cache device 410 or 411, the communication unit 123 transmits the request history information to the secondary cache device.

The secondary cache device 410 operates differently from the secondary cache device 400 according to the second exemplary embodiment. Further, the secondary cache device 411 operates differently from the secondary cache device 410 according to the second exemplary embodiment. In the present exemplary embodiment, while the cache device 120 preferentially retains shared data similarly to the second exemplary embodiment, the secondary cache devices 410 and 411 preferentially retain independent data. Therefore, overall cache utilization efficiency is improved.

The remaining configuration of the cache device 120 according to the present exemplary embodiment is the same as the configuration of the cache device 110 according to the second exemplary embodiment.

Next, an operation according to the present exemplary embodiment will be described.

Figure 8A:
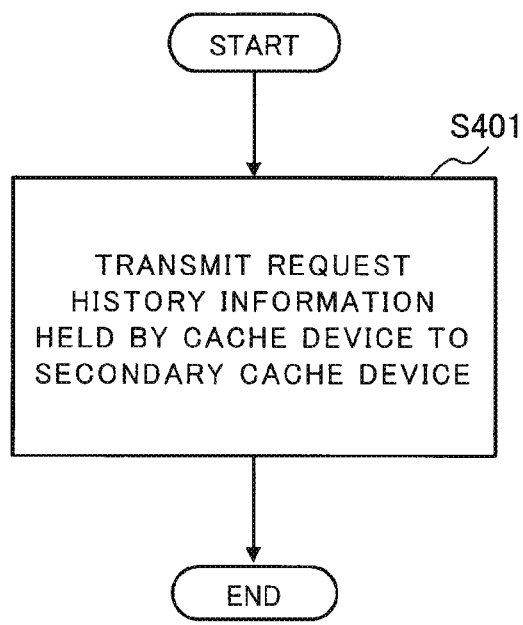
FIG. 8A is a flowchart illustrating an operation of the cache device according to the third exemplary embodiment of the present invention.

FIGS. 8A and 8B show a flowchart illustrating operations of the cache device 120 and the secondary cache devices 410 and 411 according to the third exemplary embodiment of the present invention.

FIG. 8A is a flowchart illustrating an operation of the cache device 120. The flowchart in FIG. 8A illustrates processing in case that an acquisition request for one request history is received from one secondary cache device. Processing in case that an acquisition request is received from the secondary cache device 410 will be described below as an example. The flowchart illustrated in FIG. 8A and the description below are an example and processes may be repeated as appropriate depending on required processes.

FIG. 8B is a flowchart illustrating operations of the secondary cache devices 410 and 411. The flowchart in FIG. 8B illustrates processing of one data readout from one source. Processing for the source 300 by the secondary cache device 410 will be described below as an example. The flowchart illustrated in FIG. 8B and the description below are an example and process order or the like may be interchanged and processes may be returned or repeated, as appropriate depending on required processes.

An operation of the cache device 120 according to the present exemplary embodiment is the same as the operation of the cache device 110 according to the second exemplary embodiment except that a process in Step S401 is added.

The cache device 120 receives an acquisition request for a request history from the secondary cache device 410. Then, the cache device 120 transmits request history information held by the cache device 120 (Step S401).

An operation of the secondary cache device 410 according to the present exemplary embodiment is the same as the operation of the secondary cache device 400 according to the second exemplary embodiment except that the process in Step S210 is replaced by processes in Steps S310 and S311.

The secondary cache device 410 acquires a request history of the cache device 120 from the cache device 120 (Step S310) and proceeds to a process in Step S311.

The secondary cache device 410 selects data associated with a greater number of sources in the request history of the cache device 120 as discard candidate data in preference to data associated with a less number of sources out of the specified data or data retained in the cache (Step S311) and proceeds to a process in Step S111. The aforementioned number of sources represents the number of sources that request particular data in the request history. For example, if particular data are requested twice by the source 300 and three times by the source 301, the aforementioned number of sources is 2.

If a plurality of cache data or specified data associated with the greatest number of sources exist, the secondary cache device 410 may select any of the cache data or the specified data as a discard candidate. The secondary cache device 410, for example, selects cache data corresponding to the latest read request as a discard candidate out of the data.

Next, a specific example of processing according to the present exemplary embodiment will be described.

FIGS. 9A-9D are diagrams for describing a specific example of operations of the cache device 120 and the secondary cache devices 410 and 411 according to the third exemplary embodiment of the present invention.

FIG. 9A illustrates a time series of data read requests from the sources 300 and 301 and is the same as FIG. 3A.

FIG. 9B illustrates manipulations of cache data by the secondary cache device 410. A prerequisite and a description method of a manipulation are the same as the prerequisite and the description method in FIG. 6B.

FIG. 9C illustrates manipulations of cache data by the secondary cache device 411. A prerequisite and a description method of a manipulation are the same as the prerequisite and the description method in FIG. 6C.

FIG. 9D illustrates manipulations of cache data by the cache device 120. A prerequisite and a description method of a manipulation are the same as the prerequisite and the description method in FIG. 6D.

Time "1")

The secondary cache device 410 receives a read request for specified data "data A" from a source "source A" (Step S101). Then, the secondary cache device 410 records the source in a request history (Step S102). Since cache data for the specified data "data A" do not exist (Step S103: No), the secondary cache device 410 acquires the specified data "data A" from the storage device 200 via the cache device 120 (Steps S105 and S106) and transmits the data to the source "source A" (Step S107). Since a free area required for a cache is available (Step S108: Yes), the secondary cache device 410 stores the specified data "data A" in the cache (Step S109).

The cache device 120 receives a read request for the specified data "data A" from the source "source A" via the secondary cache device 410 (Step S101). Then, the cache device 120 records the source in a request history (Step S102). Since cache data for the specified data "data A" do not exist (Step S103: No), the cache device 120 acquires the specified data "data A" from the storage device 200 (Steps S105 and S106) and transmits the data to the source "source A" via the secondary cache device 410 (Step S107). Since a free area required for a cache is available (Step S108: Yes), the cache device 120 stores the specified data "data A" in the cache (Step S109).

Time "2")

The secondary cache device 411 receives a read request for specified data "data B" from a source "source B" (Step S101). Then, the secondary cache device 411 records the source in the request history (Step S102). Since cache data for the specified data "data B" do not exist (Step S103: No), the secondary cache device 411 acquires the specified data "data B" from the storage device 200 via the cache device 120 (Steps S105 and S106) and transmits the data to the source "source B" (Step S107). Since a free area required for a cache is available (Step S108: Yes), the secondary cache device 411 stores the specified data "data B" in the cache (Step S109).

The cache device 120 receives a read request for the specified data "data B" from the source "source B" via the secondary cache device 411 (Step S101). Then, the cache device 120 records the source in the request history (Step S102). Since cache data for the specified data "data B" do not exist (Step S103: No), the cache device 120 acquires the specified data "data B" from the storage device 200 (Steps S105 and S106) and transmits the data to the source "source B" via the secondary cache device 411 (Step S107). Since a free area required for a cache is not available (Step S108: No), the cache device 120 selects the data "data A" associated with one source "source A" as a discard candidate (Step S110) and updates the selected discard candidate "data A" with the specified data "data B" (Step S111).

Time "3")

The secondary cache device 410 receives a read request for specified data "data C" from the source "source A" (Step S101). Then, the secondary cache device 410 records the source in the request history (Step S102). Since cache data for the specified data "data C" do not exist (Step S103: No), the secondary cache device 410 acquires the specified data "data C" from the storage device 200 via the cache device 120 (Steps S105 and S106) and transmits the data to the source "source A" (Step S107).

The cache device 120 receives a read request for the specified data "data C" from the source "source A" via the secondary cache device 410 (Step S101). Then, the cache device 120 records the source in the request history (Step S102). Since cache data for the specified data "data C" do not exist (Step S103: No), the cache device 120 acquires the specified data "data C" from the storage device 200 (Steps S105 and S106) and transmits the data to the source "source A" via the secondary cache device 410 (Step S107). Since a free area required for a cache is not available (Step S108: No), the cache device 120 selects the data "data B" associated with one source "source B" as a discard candidate (Step S110) and updates the selected discard candidate "data B" with the specified data "data C" (Step S111).

Since a free area required for a cache is not available (Step S108: No), the secondary cache device 410 acquires a request history of the cache device 120 (Step S310).

The cache device 120 receives an acquisition request for a request history from the secondary cache device 410. Then, the cache device 120 transmits request history information held by the cache device 120 (Step S401).

The secondary cache device 410 selects the data "data C" associated with one source "source A" as a discard candidate in accordance with the request history of the cache device 120 (Step S311) and discards the selected discard candidate "data C" (Step S111).

Time "4")

The secondary cache device 411 receives a read request for the specified data "data C" from the source "source B" (Step S101). Then, the secondary cache device 411 records the source in the request history (Step S102). Since cache data for the specified data "data C" do not exist (Step S103: No), the secondary cache device 411 acquires the specified data "data C" from the storage device 200 via the cache device 120 (Steps S105 and S106) and transmits the data to the source "source B" (Step S107).

The cache device 120 receives a read request for the specified data "data C" from the source "source B" via the secondary cache device 411 (Step S101). Then, the cache device 120 records the source in the request history (Step S102). Since cache data for the specified data "data C" exist (Step S103: Yes), the cache device 120 transmits a read response including the cache data "data C" to the source "source B" via the secondary cache device 411 (Step S104).

Since a free area required for a cache is not available (Step S108: No), the secondary cache device 411 acquires a request history of the cache device 120 (Step S310).

The cache device 120 receives an acquisition request for a request history from the secondary cache device 411. Then, the cache device 120 transmits request history information held by the cache device 120 (Step S401).

The secondary cache device 411 selects the data "data C" associated with two sources "source A" and "source B" as a discard candidate in accordance with the request history of the cache device 120 (Step S311) and discards the selected discard candidate "data C" (Step S111).

Time "5")

The secondary cache device 410 receives a read request for the specified data "data A" from the source "source A" (Step S101). Then, the secondary cache device 410 records the source in the request history (Step S102). Since cache data for the specified data "data A" exist (Step S103: Yes), the secondary cache device 410 transmits a read response including the cache data "data A" to the source "source A" (Step S104).

Time "6")

The secondary cache device 411 receives a read request for the specified data "data B" from the source "source B" (Step S101). Then, the secondary cache device 411 records the source in the request history (Step S102). Since cache data for the specified data "data B" exist (Step S103: Yes), the secondary cache device 411 transmits a read response including the cache data "data B" to the source "source B" (Step S104).

Time "7")

The secondary cache device 410 operates in the same way as at the time "3."

The cache device 120 receives a read request for the specified data "data C" from the source "source A" via the secondary cache device 410 (Step S101). Then, the cache device 120 records the source in the request history (Step S102). Since cache data for the specified data "data C" exist (Step S103: Yes), the cache device 120 transmits a read response including the cache data "data C" to the source "source A" via the secondary cache device 410 (Step S104).

The cache device 120 receives an acquisition request for a request history from the secondary cache device 410. Then, the cache device 120 transmits request history information held by the cache device 120 (Step S401).

Time "8")

The secondary cache device 411 operates in the same way as at the time "4."

The cache device 120 operates in the same way as at the time "4."

As described above, the cache device 120 according to the present exemplary embodiment retains shared data in a cache in preference to independent data. In particular, if cache capacity is sufficient for retaining entire shared data, the cache device 120 retains entire read shared data in the cache. Further, the cache device 120 dynamically judges whether or not specified data are shared data while the cache is in operation, in accordance with a request history. Therefore, the cache device 120 according to the present exemplary embodiment is capable of dynamically distinguishing between independent data and shared data and preferentially retaining shared data in the cache while the cache is in operation.

The secondary cache device 410 preferentially retains independent data of the source 300 in a cache. In particular, if cache capacity is sufficient for retaining entire independent data of the source 300, the secondary cache device 410 retains entire read independent data of the source 300 in the cache. The secondary cache device 411 operates in the same way as the secondary cache device 410. In other words, the secondary cache devices 410 and 411 preferentially retain independent data of the sources 300 and 301 in the cache, respectively, and the cache device 120 preferentially retains shared data in the cache. Therefore, in the cache device 120, if the cache device 120 has cache capacity sufficient for retaining shared data and the secondary cache devices 410 and 411 respectively hold cache capacity sufficient for retaining independent data, a hit rate of the cache is high regardless of a ratio of read requests for independent data to read requests for shared data.

Further, if the secondary cache devices 410 and 411 respectively hold cache capacity sufficient for retaining independent data, the secondary cache devices 410 and 411 solely retain a cache for independent data, respectively. On the other hand, if the cache device 120 has cache capacity sufficient for retaining shared data, the cache device 120 solely retains a cache for shared data. Consequently, in the cache device 120 according to the present exemplary embodiment, overall cache utilization efficiency is improved compared with a case in which the cache device 110 is used.

Fourth Exemplary Embodiment

Next, a fourth exemplary embodiment of the present invention which is a storage including the cache device according to the aforementioned second exemplary embodiment will be described. In the following description, a same reference sign is given to a similar component described in the second exemplary embodiment, thus omitting description thereof accordingly.

First, a configuration according to the present exemplary embodiment will be described.

Figure 10:
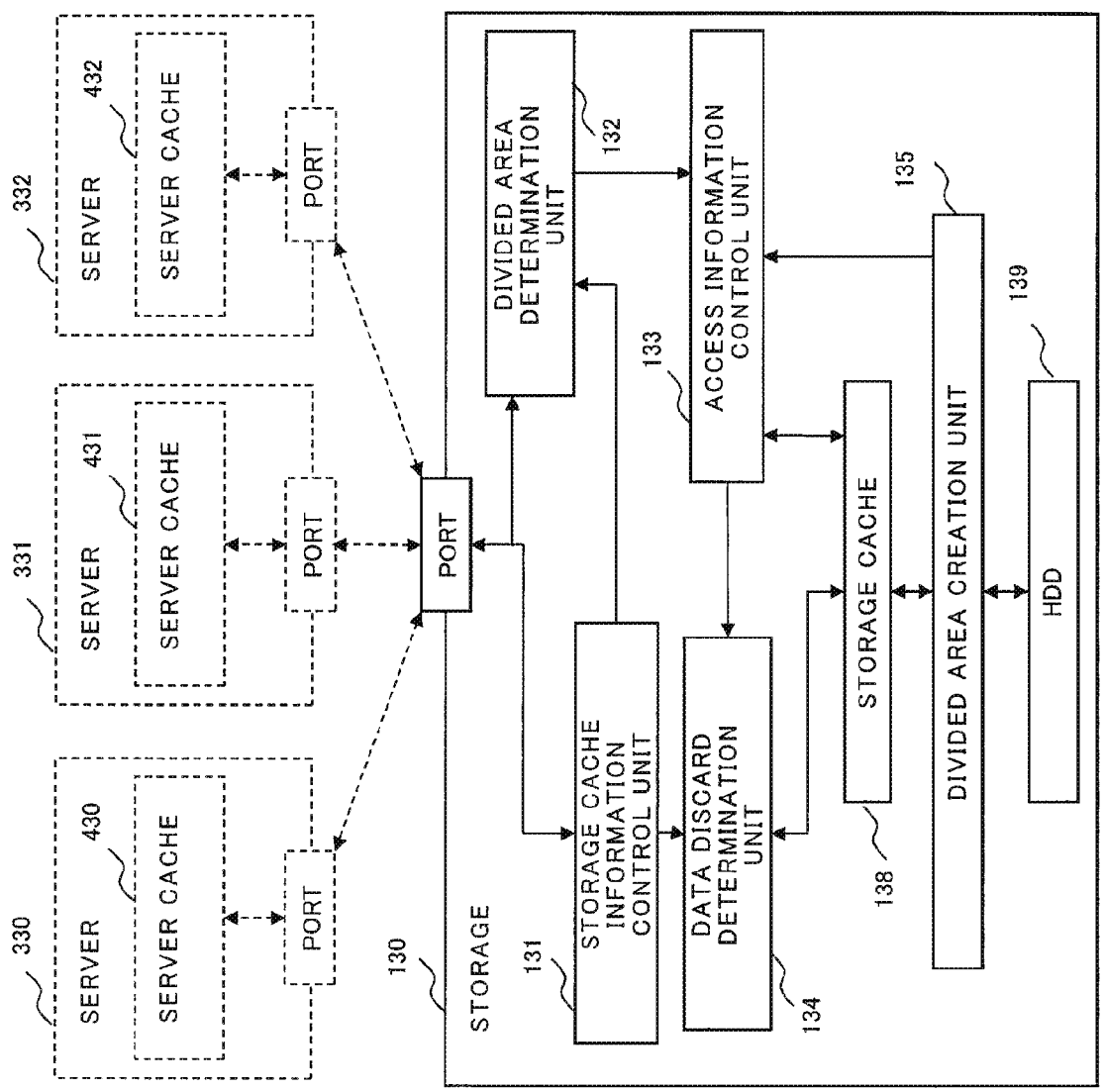
FIG. 10 is a block diagram illustrating an example of a configuration of a storage 130 according to a fourth exemplary embodiment of the present invention.

FIG. 10 is a block diagram illustrating an example of a configuration of a storage 130 according to the fourth exemplary embodiment of the present invention.

The storage 130 is connected to server caches 430, 431, and 432. The storage 130 is connected to servers 330, 331, and 332 via the server caches 430, 431, and 432, respectively. The server caches 430, 431, and 432 are respectively included in the servers 330, 331, and 332. The storage 130 is a storage device including a cache that retains data to be read by the servers 330, 331, and 332.

The storage 130 includes a storage cache information control unit 131, a divided area determination unit 132, an access information control unit 133, a data discard determination unit 134, a divided area creation unit 135, a storage cache 138, and a HDD (Hard Disk Drive) 139.

If a data read request is issued to the storage 130 from each server, the storage cache information control unit 131 determines whether or not specified data for data readout exist in the storage cache 138 and measures a usage amount of the storage cache 138.

The divided area determination unit 132 determines which "divided area" on the storage cache 138 specified data for data readout belong to. The "divided area" will be described later.

The access information control unit 133 stores a request history of data read requests from each server.

The data discard determination unit 134 determines discard target data out of data existing in the storage cache 138. The data discard determination unit 134 selects independent data as discard target data in preference to shared data out of data existing in the storage cache 138.

While the divided area creation unit 135 causes the storage cache 138 to newly retain data, the divided area creation unit 135 creates a new "divided area."

The storage cache 138 temporarily retains data read from the HDD 139.

The HDD 139 always retains data read by the servers 330, 331, and 332.

Next, an operation according to the present exemplary embodiment will be described.

Figure 11:
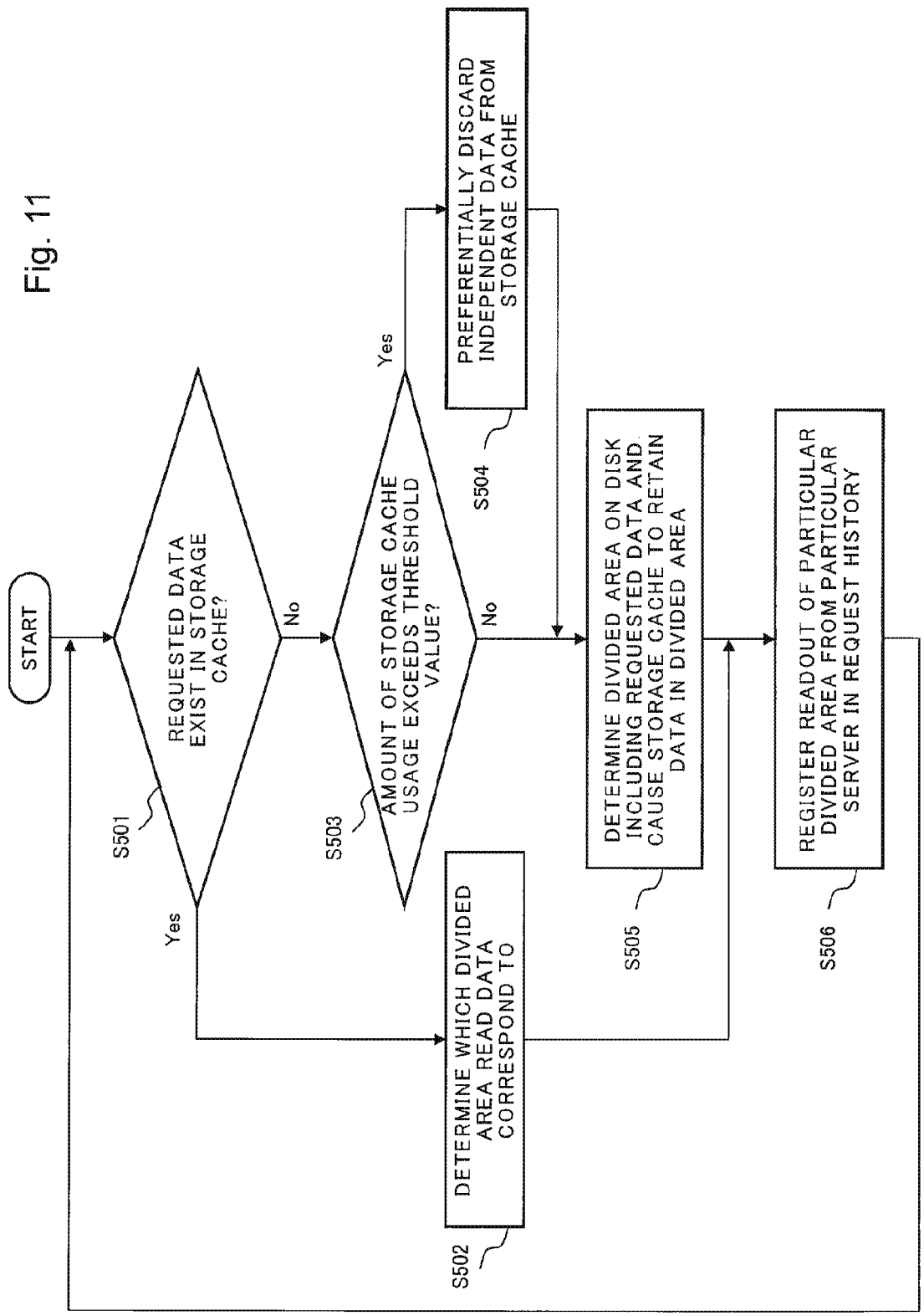
FIG. 11 is a flowchart illustrating an operation of the storage 130 according to the fourth exemplary embodiment of the present invention.

FIG. 11 is a flowchart illustrating an operation of the storage 130 according to the fourth exemplary embodiment of the present invention. In the flowchart in FIG. 11, only update processes of cache data in a storage cache are illustrated for ease of description and other processes are omitted. Further, the flowchart illustrated in FIG. 11 and the description below are an example, and process order or the like may be interchanged and processes may be returned or repeated, as appropriate depending on required processes.

The storage cache information control unit 131 determines whether or not specified data in a data read request from each server exist in the storage cache 138 (Step S501). If the data exist (Step S501: Yes), the storage cache information control unit 131 proceeds to a process in Step S502. On the other hand, if the data do not exist (Step S501: No), the storage cache information control unit 131 proceeds to a process in Step S503.

The divided area determination unit 132 determines which "divided area" specified data in a data read request correspond to (Step S502) and proceeds to a process in Step S506.

The data discard determination unit 134 determines whether or not an amount of storage cache usage exceeds a predetermined threshold value, in accordance with information from the storage cache information control unit 131 (Step S503). If the amount exceeds the threshold value (Step S503: Yes), the data discard determination unit 134 proceeds to a process in Step S504. If the amount does not exceed the threshold value (Step S503: No), the divided area creation unit 135 proceeds to a process in Step S505.

The data discard determination unit 134 discards data in a particular "divided area" giving priority to a "divided area" being independent data (Step S504) and proceeds to a process in Step S505. The data discard determination unit 134 may determine a discard target in accordance with "server priority" associated with a "divided area." A specific example of a selection method of a discard target will be described later.

The divided area creation unit 135 determines a "divided area" specified by use of a starting address and an ending address in a logical disk so as to cover a range in which specified data in a data read request are included, and causes the storage cache 138 to retain data existing in the "divided area" (Step S505). A specific example of a creation method of a new "divided area" will be described later.

The access information control unit 133 registers in a request history that there exists readout of a particular "divided area" from a server being a data read source (Step S506) and returns to the process in Step S501.

Next, a specific example of processing according to the present exemplary embodiment will be described.

First, the "divided area" will be described.

Figure 12:
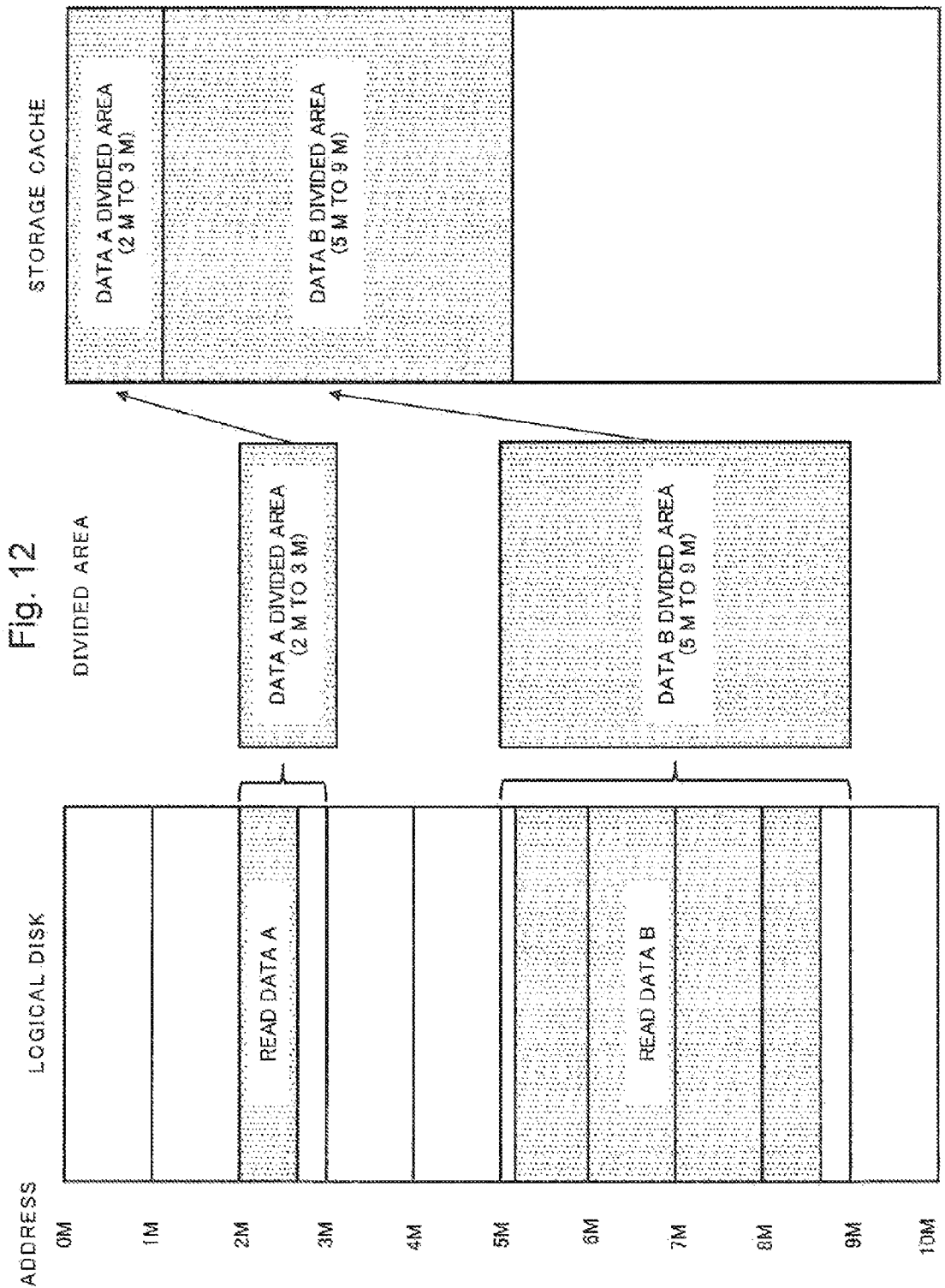
FIG. 12 is a diagram for describing a specific example of a creation method of a "divided area" in the storage 130 according to the fourth exemplary embodiment of the present invention.

FIG. 12 is a diagram for describing a specific example of a creation method of a "divided area" in the storage 130 according to the fourth exemplary embodiment of the present invention.

The "divided area" refers to a data specification method by which the storage 130 manages data on the HDD 139 as cache data. A divided area is a set of a starting address and an ending address of a block including particular data in a "logical disk" into which the HDD 139 is abstracted. While a case that a minimum unit of a block in a divided area is "1 MB" will be described below, a minimum unit is not limited to "1 MB."

First, the storage 130 receives a read command for data in an address range of "2 MB" to "2.7 MB" in a logical disk from a server.

Since a minimum unit of a block in a divided area is "1 MB," the divided area creation unit 135 in the storage 130 creates a block with a starting address of "2 MB" and an ending address of "3 MB" as a divided area and retains the data in the storage cache 138.

Next, the storage 130 receives a read command for data in an address range of "5.2 MB" to "8.6 MB" in a logical disk from a server.

The divided area creation unit 135 creates a block with a starting address of "5 MB" and an ending address of "9 MB" as a divided area and retains the data in the storage cache 138.

Then, the storage 130 receives a read command for data in an address range of "8.7 MB" to "8.9 MB" in the same logical disk from another server.

Data specified by the latest data read command are data different from data specified by the immediately preceding data read command. However, the data specified by the latest data read command are included in the divided area retained on the storage cache 138 in response to the immediately preceding data read command. Therefore, the storage 130 regards the data specified by the latest data read command as the same data as the data specified by the immediately preceding data read command.

Next, a specific example of a selection method of data discarded from the storage cache 138 will be described.

Figure 13:
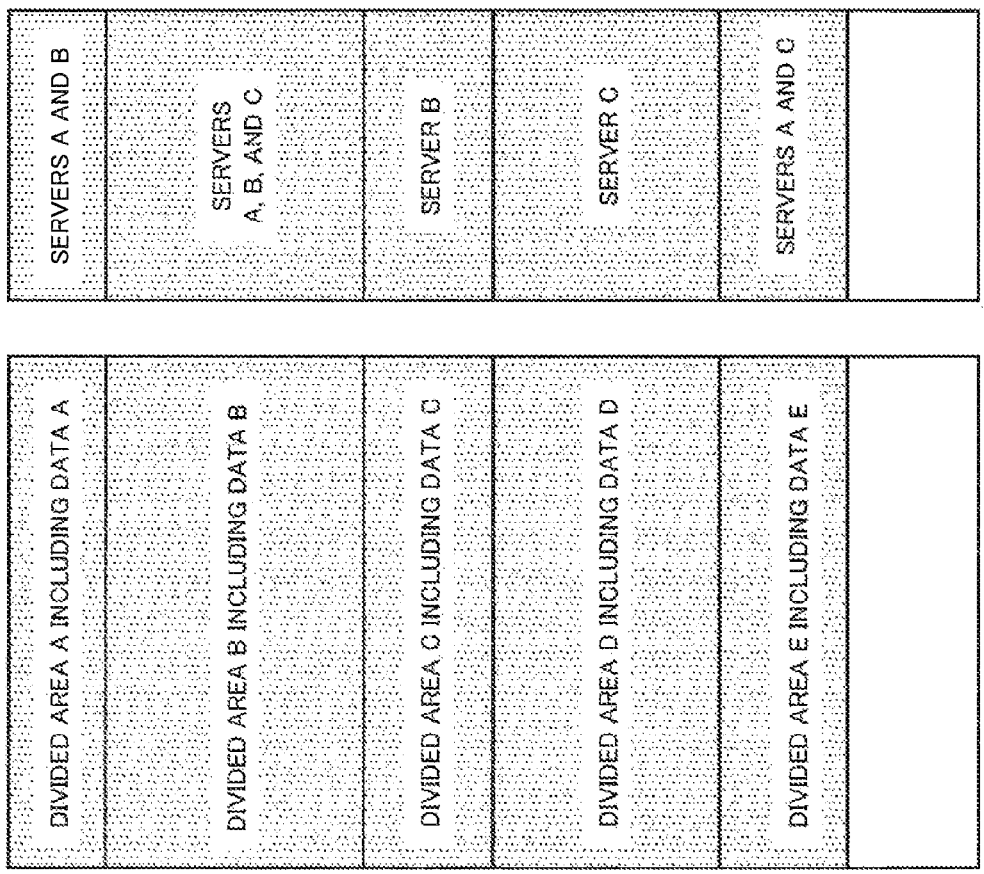
FIG. 13 is a diagram for describing a specific example of a selection method of data to be discarded from a storage cache 138 in the storage 130 according to the fourth exemplary embodiment of the present invention.

FIG. 13 is a diagram for describing a specific example of a selection method of data discarded from the storage cache 138 in the storage 130 according to the fourth exemplary embodiment of the present invention.

First, the storage 130 receives a data read request for data A not retained on the storage cache 138 from a server A.

The storage 130 retains a divided area A including the data A on the storage cache 138. Further, the storage 130 registers the read request from the server A to the divided area A into a request history. At this time, the storage 130 distinguishes that the divided area A is independent data of the server A.

Next the storage 130 receives a data read request for data included in the divided area A that exists on the storage cache 138 from a server B.

The storage 130 adds, to the request history regarding the divided area A already existing, that there is a data read request from the server B. Consequently, the storage 130 distinguishes that the divided area A is shared data of the servers A and B.

The storage 130 similarly receives data read requests for data B, C, D, or E from servers A, B, and C. As a result, the storage 130 creates divided areas B, C, D, and E as illustrated in FIG. 13 and retains a request history regarding each divided area.

As illustrated in FIG. 13, the divided areas A, B, and E regarding which data read requests from a plurality of servers are recorded in the request history, respectively, are shared data. On the other hand, the divided areas C and D regarding which a data read request from one server is recorded in the request history, respectively, are independent data.

The storage 130 may discard cache data from the storage cache 138 in accordance with priority per server. For example, assume that priority per server regarding from which server a data read request is preferentially kept in the storage cache 138 is defined as the server A, the server B, and the server C, in descending order of priority. In this case, if a usage amount of the storage cache 138 exceeds a threshold value, the storage 130 discards, with the highest priority, the divided area D that are independent data with low server priority, from the storage cache 138.

Further, if only shared data exist on the storage cache 138, the storage 130 may preferentially discard cache data with a low data "sharing level" and low priority per server from the storage cache 138 out of the shared data. The "sharing level" represents the number of servers sharing shared data.

In a situation illustrated in FIG. 13, the priority order by which cache data are discarded is the divided area D, the divided area C, the divided area E, the divided area A, and the divided area B in descending order of priority.

Priority per server is predetermined by a user or acquirable by gathering statistics on data readout priority. For example, if a data read command conforming to the "SCSI Architecture Model" is used, the storage 130 is capable of acquiring priority per server by referring to a "Command priority" value in a data read command.

As described above, the storage 130 according to the present exemplary embodiment retains shared data in a storage cache in preference to independent data. In particular, if cache capacity sufficient for retaining entire shared data, the storage 130 retains entire read shared data in the storage cache. Further, the storage 130 dynamically judges whether or not specified data are shared data while the cache is in operation, in accordance with a request history. Therefore, the storage 130 according to the present exemplary embodiment is capable of dynamically distinguishing between independent data and shared data and preferentially retaining shared data in the cache while the cache is in operation.

Further, it is highly likely that the storage 130 according to the present exemplary embodiment retains shared data of each server in the storage cache 138. Therefore, the storage 130 according to the present exemplary embodiment exhibits an effect that a hit rate of a cache is high if a ratio of shared data to independent data is high.

Further, in the storage 130 according to the present exemplary embodiment, shared data are preferentially retained in the storage cache 138, and therefore cache capacity is efficiently utilized if a ratio of shared data to independent data is high. Therefore, the storage 130 according to the present exemplary embodiment is capable of reducing memory capacity of a read cache and allocating the corresponding memory capacity to a write cache if a ratio of shared data to independent data is high.

Further, in the storage 130 according to the present exemplary embodiment, it is highly likely that data requested by a high-priority server are retained in the storage cache 138 if cache data to be discarded are determined in accordance with a data sharing level and priority per server. Therefore, the storage 130 according to the present exemplary embodiment is capable of suppressing degradation of response performance for a data read request from a high-priority server even under high load.

While a minimum unit of a divided area is assumed to be 1 MB in the aforementioned description, a minimum unit is not limited to 1 MB. Further, while a divided area is used to determine data identity, another method may be used for determination of data identity. For example, data retained in the storage cache 138 are identified by use of a set of a starting address and a data length of specified data in a data read request.

Further, a data sharing level and priority per server are used for determining discard target data in the aforementioned description. However, another element may be used for determination of discard target data. For example, in determining discard target data, new elements such as preferentially discarding cache data in chronological order of the latest time of data read request, or preferentially discarding cache data in ascending order of request frequency, may be added. Further, a weighted total of priority based on each element may be calculated for each divided area, and cache data with a low weighted total may be preferentially discarded.

Fifth Exemplary Embodiment

Next, a fifth exemplary embodiment of the present invention in which a server cache and a storage cache cooperate to retain cache data in the aforementioned fourth exemplary embodiment will be described. In the following description, a same reference sign is given to a similar component described in the fourth exemplary embodiment, thus omitting description thereof accordingly.

First, cache data placement according to the present exemplary embodiment will be described.

FIGS. 14A and 14B are diagrams illustrating an example of cache data placement according to the fourth and fifth exemplary embodiments of the present invention. In the fourth exemplary embodiment of the present invention, it is highly likely that identical shared data are retained in each server cache (FIG. 14A). On the other hand, in the present exemplary embodiment, it is highly likely that only shared data are retained in a storage cache and only independent data are retained in a server cache (FIG. 14B).

FIG. 14B will be described in detail.

It is highly likely that independent data A referred to only by a server A are retained only by a server cache A. In other words, the independent data A temporarily retained by a storage cache are preferentially discarded after being retained by a server cache. The same holds for independent data B and C.

It is highly likely that shared data D referred to by a plurality of servers A, B, and C are retained only by a storage cache. In other words, the shared data D temporarily retained by a server cache A, B, or C are preferentially discarded after being retained by a storage cache.

Next, a configuration according to the present exemplary embodiment will be described.

Figure 15:
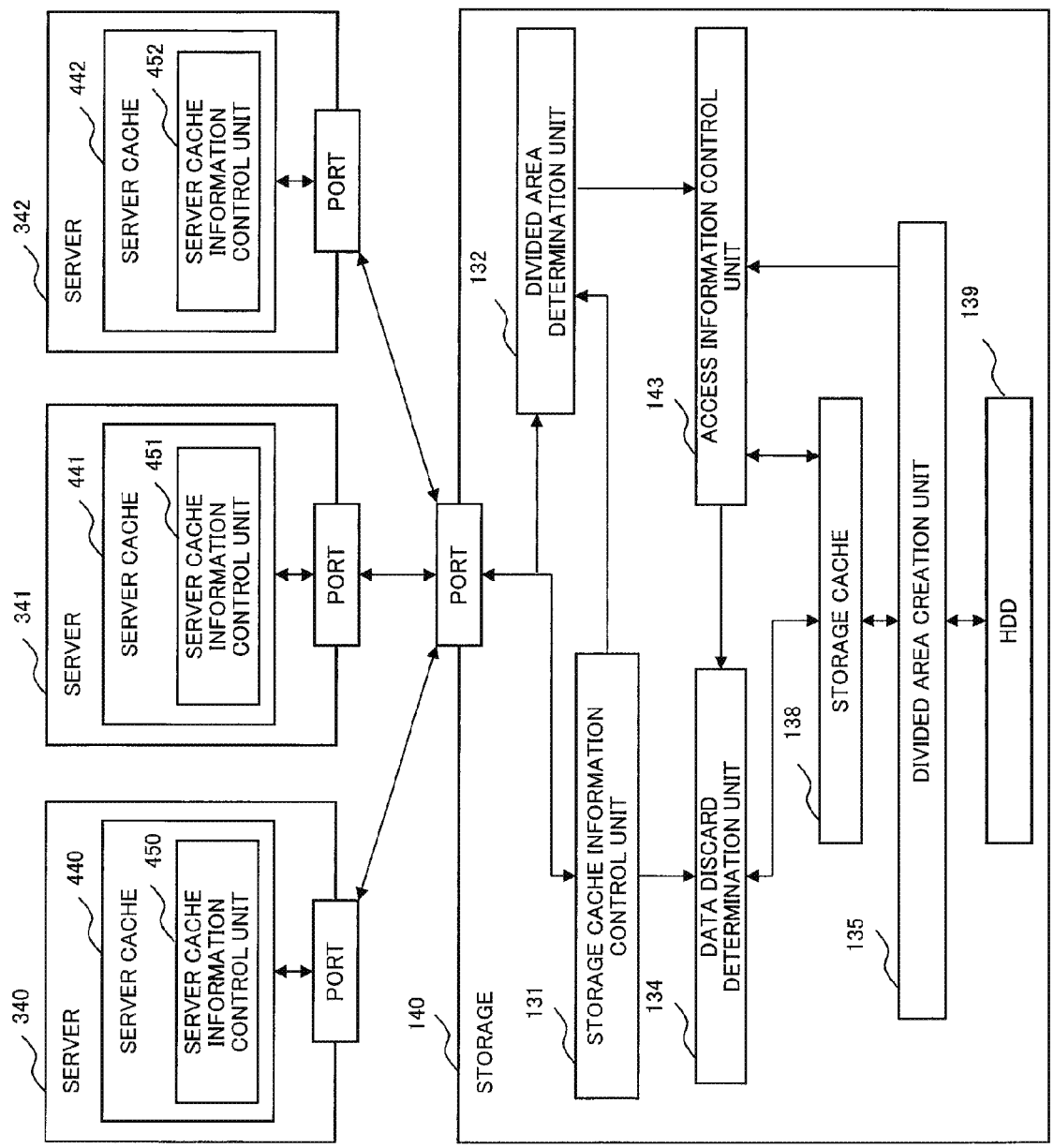
FIG. 15 is a block diagram illustrating an example of configurations of a storage 140 and servers 340, 341, and 342 according to the fifth exemplary embodiment of the present invention.

FIG. 15 is a block diagram illustrating an example of configurations of a storage 140 and servers 340, 341, and 342 according to the fifth exemplary embodiment of the present invention.

A configuration of the storage 140 according to the present exemplary embodiment is the same as the configuration of the storage 130 according to the fourth exemplary embodiment. However, an access information control unit 143 according to the present exemplary embodiment operates differently from the access information control unit 133 according to the fourth exemplary embodiment.

If the access information control unit 143 receives an "acquisition command" for acquiring request history information held by the storage 140, the access information control unit 143 transmits the request history information held by the storage 140.

Further, if the access information control unit 143 receives a "discard command" for discarding a particular divided area (cache data) in the storage 140, the access information control unit 143 discards the divided area if the specified divided area is independent data, and deletes the target server from a request history if the specified divided area is shared data.

The remaining operation of the access information control unit 143 is the same as the access information control unit 133 according to the fourth exemplary embodiment.

A configuration of the server 340 will be described. Configurations of the servers 341 and 342 are respectively the same as the configuration of the server 340. Further, the servers 340, 341, and 342 respectively include server caches 440, 441, and 442. Further, the server caches 440, 441, and 442 respectively include server cache information control units 450, 451, and 452.

The server cache 440 in the server 340 includes the server cache information control unit 450.

Further, the server cache information control unit 450 transmits an acquisition command to the storage 140 and receives request history information held by the storage 140.

Further, the server cache information control unit 450 determines whether or not each divided area (cache data) on a storage cache 138 is retained by the server cache 440, in accordance with the acquired request history information.

Further, the server cache information control unit 450 determines which of the server cache 440 or the storage cache 138 each piece of cache data should be retained by.

Further, the server cache information control unit 450 transmits a discard command for causing the storage 140 to discard a particular divided area (cache data) on the storage cache 138.

The remaining configuration of the server 340 according to the present exemplary embodiment is the same as the configuration of the server 330 according to the fourth exemplary embodiment.

A response to the acquisition command includes at least request history information about a divided area in which a request history from the server 340 exists out of request history information held by the storage 140. Request history information about one divided area includes, for example, information about presence of a data read request from each server for a starting address of a divided area, a data length of a divided area, and divided area data.

Further, a discard command includes, for example, a starting address and a data length of a divided area.

Alternatively, an identifier of each divided area may be notified to the server cache 440 in response to the acquisition command, and each divided area may be identified by use of the identifier of the divided area in the discard command.

Next, an operation according to the present exemplary embodiment will be described.

Figure 16:
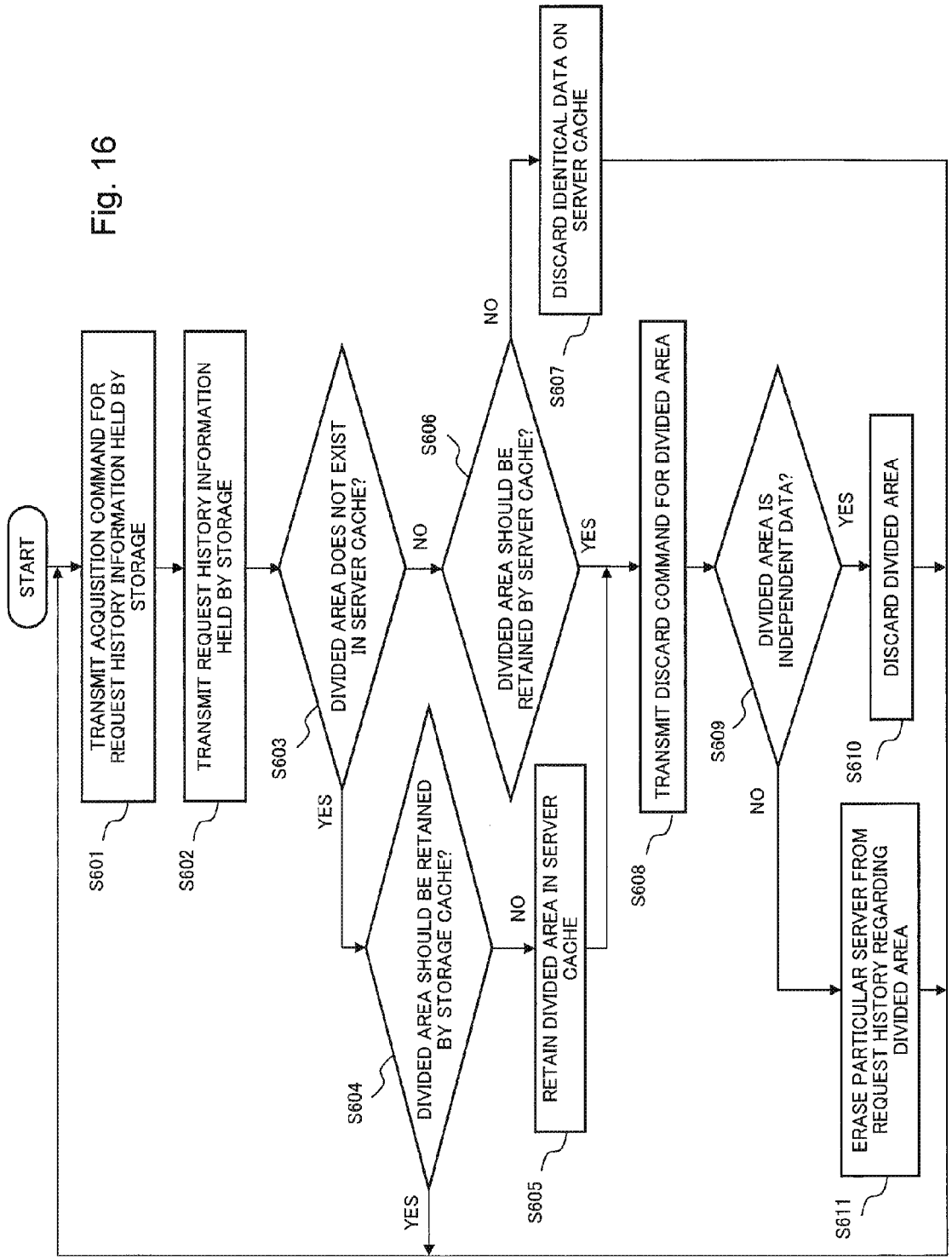
FIG. 16 is a flowchart illustrating operations of the storage 140 and the server 340 according to the fifth exemplary embodiment of the present invention.

FIG. 16 is a flowchart illustrating operations of the storage 140 and the server 340 according to the fifth exemplary embodiment of the present invention. Operations of the servers 341 and 342 are respectively the same as the operation of the server 340. The flowchart in FIG. 16 illustrates update processes of only one piece of cache data in a storage cache and a server cache for ease of description, and other processes are omitted. Further, the flowchart illustrated in FIG. 16 and the description below are an example, and process order or the like may be interchanged and processes may be returned or repeated, as appropriate depending on required processes.

The server cache information control unit 450 in the server 340 transmits a command for acquiring request history information held by the storage 140 to the storage 140 (Step S601) and proceeds to a process in Step S602.

The access information control unit 143 in the storage 140 receives the acquisition command from the server 340 and transmits request history information about a divided area requested by the server 340 out of request history information about divided areas retained in the access information control unit 143 (Step S602) and proceeds to a process in Step S603. A divided area is handled in the same way as in the fourth exemplary embodiment of the present invention.

The server cache information control unit 450 in the server 340 determines whether or not each divided area of the storage cache 138 is retained in the server cache 440, in accordance with request history information held by the storage cache 138 (Step S603). If the divided area does not exist (Step S603: Yes), the server cache information control unit 450 proceeds to a process in Step S604. On the other hand, if the divided area exists (Step S603: No), the server cache information control unit 450 proceeds to a process in Step S606.

The server cache information control unit 450 in the server 340 determines whether or not a particular divided area should be retained by the storage cache 138, in accordance with a sharing level, request frequency, and the like of each divided area (cache data) (Step S604). If the divided area should be retained by the storage cache 138 (Step S604: Yes), the server cache information control unit 450 returns to the process in Step S601. On the other hand, if the divided area should be retained by the server cache 440 (Step S604: No), the server cache information control unit 450 proceeds to a process in Step S605.

The server cache information control unit 450 in the server 340 retains the particular divided area in the server cache 440 (Step S605) and proceeds to a process in Step S608.

The server cache information control unit 450 in the server 340 determines whether or not a particular divided area should be retained by the server cache 440, in accordance with a sharing level, request frequency, and the like of each divided area (cache data) (Step S606). If the divided area should be retained by the server cache 440 (Step S606: Yes), the server cache information control unit 450 proceeds to a process in Step S608. On the other hand, if the divided area should be retained by the storage cache 138 (Step S606: No), the server cache information control unit 450 proceeds to a process in Step S607.

The server cache information control unit 450 in the server 340 discards the particular divided area of the server cache 440 (Step S607) and returns to the process in Step S601.

The server cache information control unit 450 in the server 340 transmits a command for causing the particular divided area (cache data) of the storage cache 138 to be discarded to the storage 140 (Step S608) and proceeds to a process in Step S609.

The access information control unit 143 in the storage 140 receives the discard command and determines whether or not the specified divided area is independent data (Step S609). If the area is independent data (Step S609: Yes), the access information control unit 143 proceeds to a process in Step S610. On the other hand, if the area is shared data (Step S609: No), the access information control unit 143 proceeds to a process in Step S611.

The access information control unit 143 in the storage 140 discards the particular divided area from the storage cache 138 (Step S610) and returns to the process in Step S601.

The access information control unit 143 in the storage 140 erases the server 340 from the request history regarding the particular divided area (Step S611) and returns to the process in Step S601.

As described above, the server 340 according to the present exemplary embodiment is capable of discarding shared data retained in the server cache 440. Therefore, the server 340 according to the present exemplary embodiment exhibits an effect of improving utilization efficiency of limited server cache capacity or reducing server cache capacity, in addition to the effect exhibited by the fourth exemplary embodiment of the present invention.

Further, in the servers 340, 341, and 342 and the storage 140 according to the present exemplary embodiment, it is not likely that identical data are retained in a server cache and a storage cache. Therefore, the server 340, 341, and 342 or the storage 140 according to the present exemplary embodiment exhibits an effect of improving utilization efficiency of limited capacity of a server cache or a storage cache, or reducing capacity of a server cache or a storage cache, in additions to the effect exhibited by the fourth exemplary embodiment of the present invention.

While the cache device according to each of the aforementioned exemplary embodiments may be realized by a dedicated device, the device may also be realized by a computer (information process device). In this case, such a computer reads a software program stored in a memory (not illustrated) into a CPU (Central Processing Unit, not illustrated) and, by executing the read software program on the CPU, outputs the execution result to, for example, a user interface. In cases of each of the aforementioned exemplary embodiments and modified examples thereof, such a software program has only to include a statement that can realize a function of each unit in the cache device 100 illustrated in FIG. 1, each unit in the cache device 110 illustrated in FIG. 4, or each unit in the cache device 120 illustrated in FIG. 7 as described above. It is also conceivable that the cache unit 101 in the cache device 100, the cache unit 101 in the cache device 110, or the cache unit 101 in the cache device 120 includes hardware as appropriate. In such a case, such a software program (computer program) can be perceived to configure the present invention. Further, a computer-readable storage medium storing such a software program can also be perceived to configure the present invention.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

This application is based upon and claims the benefit of priority from Japanese Patent Application No. 2014-250580, filed on Dec. 11, 2014, the disclosure of which is incorporated herein in its entirety by reference.

The aforementioned exemplary embodiments may also be described in whole or part as the following Supplementary Notes but are not limited thereto.

(Supplementary Note 1)

A cache device connected to a storage device and connected to a plurality of sources, the cache device including:

a cache unit that receives a first read request from a first of the sources, and, if not retaining first data specified in the first read request, transmits the first read request to the storage device, receives a first read response from the storage device, and transmits the first read response to the first source, and meanwhile, if retaining the first data, transmits a second read response including the first data to the first source; and a storage area control unit that stores the first source as a first history in association with specification of the first data, and, if the first data are not retained by the cache unit and a storage area sufficient for retaining the first data exists in the cache unit, causes the cache unit to store the first data, and meanwhile, if the first data are not retained by the cache unit and a storage area sufficient for retaining the first data does not exist in the cache unit, selects data associated with a less number of the sources in the first history as second data in preference to data associated with a greater number of the sources in the first history out of the first data or data retained by the cache unit, and, if the second data differ from the first data, causes the cache unit to discard the second data and then store the first data.

(Supplementary Note 2)

The cache device according to Supplementary Note 1, being connected to a plurality of the sources via one secondary cache device, respectively, wherein the secondary cache device receives a second read request from the first source, and, if not retaining third data specified in the second read request, transmits the second read request to the storage device via the cache device, receives a third read response from the storage device via the cache device, and transmits the third read response to the first source, and meanwhile, if retaining the third data, transmits a fourth read response including the third data to the first source, and the secondary cache device stores the first source as a second history in association with specification of the third data, and, if the third data are not retained and a storage area sufficient for retaining the third data exists, stores the third data, and meanwhile, if the third data are not retained and a storage area sufficient for retaining the third data does not exist, selects data less frequently associated with the source in the second history as fourth data in preference to data more frequently associated with the source in the second history out of the third data or retained data, and, if the fourth data differ from the third data, discards the fourth data and then stores the third data.

(Supplementary Note 3)

The cache device according to Supplementary Note 1, being connected to a plurality of the sources via one secondary cache device, respectively, wherein the cache device further includes a communication unit that transmits information about the first history to the secondary cache device, the secondary cache device receives a second read request from the first source, and, if not retaining third data specified in the second read request, transmits the second read request to the storage device via the cache device, receives a third read response from the storage device via the cache device, and transmits the third read response to the first source, and meanwhile, if retaining the third data, transmits a fourth read response including the third data to the first source, and the secondary cache device, if the third data are not retained and a storage area sufficient for retaining the third data exists, stores the third data, and meanwhile, if the third data are not retained and a storage area sufficient for retaining the third data does not exist, acquires information about the first history from the cache device and selects data associated with a greater number of the sources in the first history as fifth data in preference to data associated with a less number of the sources in the first history out of the third data or retained data, and, if the fifth data differ from the third data, discards the fifth data and then stores the third data.

(Supplementary Note 4)

A secondary cache device connected to a storage device via the cache device according to Supplementary Note 1 and connected to one source, respectively, the secondary cache device acquiring information about the first history from the cache device and determining data to be discarded in accordance with the first history.

(Supplementary Note 5)

A secondary cache device connected to a storage device via the cache device according to Supplementary Note 1 and connected to one source, respectively, the secondary cache device including:

a secondary cache unit that receives a second read request from the first source, and, if not retaining third data specified in the second read request, transmits the second read request to the storage device via the cache device, receives a third read response from the storage device via the cache device, and transmits the third read response to the first source, and meanwhile, if retaining the third data, transmits a fourth read response including the third data to the first source; and a secondary storage area control unit that, if the third data are not retained and a storage area sufficient for retaining the third data exists, stores the third data, and meanwhile, if the third data are not retained and a storage area sufficient for retaining the third data does not exist, acquires information about the first history from the cache device and selects data associated with a greater number of the sources in the first history as fifth data in preference to data associated with a less number of the sources in the first history out of the third data or retained data, and if the fifth data differ from the third data, discards the fifth data and then stores the third data.

(Supplementary Note 6)

The cache device according to Supplementary Note 1, wherein the storage area control unit, when causing the cache unit to store the first data, causes the cache unit to store a data block including the first data retained by the storage device, as the first data, and the cache unit, when determining whether or not to retain the first data, determines to retain the first data if the first data are included in a data block stored as the first data.

(Supplementary Note 7)

A cache system including:

a cache device connected to a storage device; and a plurality of secondary cache devices connected to the storage device via the cache device, and connected to one source, respectively, wherein the cache device includes a cache unit that receives a first read request from a first of the sources via the secondary cache device, and, if not retaining first data specified in the first read request, transmits the first read request to the storage device, receives a first read response from the storage device, and transmits the first read response to the first source via the secondary cache device, and meanwhile, if retaining the first data, transmits a second read response including the first data to the first source via the secondary cache device, and a storage area control unit that stores the first source as a first history in association with specification of the first data, and, if the first data are not retained by the cache unit and a storage area sufficient for retaining the first data exists in the cache unit, causes the cache unit to store the first data, and meanwhile, if the first data are not retained by the cache unit and a storage area sufficient for retaining the first data does not exist in the cache unit, selects data associated with a less number of the sources in the first history as second data in preference to data associated with a greater number of the sources in the first history out of the first data or data retained by the cache unit, and, if the second data differ from the first data, causes the cache unit to discard the second data and then store the first data, and the secondary cache device includes a secondary cache unit that receives a second read request from the first source, and, if not retaining third data specified in the second read request, transmits the second read request to the storage device via the cache device, receives a third read response from the storage device via the cache device, and transmits the third read response to the first source, and meanwhile, if retaining the third data, transmits a fourth read response including the third data to the first source, and a secondary storage area control unit that, if the third data are not retained and a storage area sufficient for retaining the third data exists, stores the third data, and meanwhile, if the third data are not retained and a storage area sufficient for retaining the third data does not exist, acquires information about the first history from the cache device and selects data associated with a greater number of the sources in the first history as fourth data in preference to data associated with a less number of the sources in the first history out of the third data or retained data, and, if the fourth data differ from the third data, discards the fourth data and then stores the third data.

(Supplementary Note 8)

A cache method in a cache device connected to a storage device and connected to a plurality of sources, the cache method including:

receiving a first read request from a first of the sources, and, if not retaining first data specified in the first read request, transmitting the first read request to the storage device, receiving a first read response from the storage device, and transmitting the first read response to the first source, and meanwhile, if retaining the first data, transmitting a second read response including the first data to the first source; and storing the first source as a first history in association with specification of the first data, and, if the first data are not retained and a storage area sufficient for retaining the first data exists, storing the first data, and meanwhile, if the first data are not retained and a storage area sufficient for retaining the first data does not exist, selecting data associated with a less number of the sources in the first history as second data in preference to data associated with a greater number of the sources in the first history out of the first data or retained data, and, if the second data differ from the first data, discarding the second data and then storing the first data.

(Supplementary Note 9)

A computer-readable recording medium recording a cache program for causing a computer to execute, as a cache device connected to a storage device and connected to a plurality of sources:

a cache process of receiving a first read request from a first of the sources, and, if not retaining first data specified in the first read request, transmitting the first read request to the storage device, receiving a first read response from the storage device, and transmitting the first read response to the first source, and meanwhile, if retaining the first data, transmitting a second read response including the first data to the first source; and a storage area control process of storing the first source as a first history in association with specification of the first data, and, if the first data are not retained and a storage area sufficient for retaining the first data exists, storing the first data, and meanwhile, if the first data are not retained and a storage area sufficient for retaining the first data does not exist, selecting data associated with a less number of the sources in the first history as second data in preference to data associated with a greater number of the sources in the first history out of the first data or retained data, and, if the second data differ from the first data, discarding the second data and then storing the first data.

(Supplementary Note 10)

The cache device according to Supplementary Note 2, wherein the storage area control unit, when causing the cache unit to store the first data, causes the cache unit to store a data block including the first data retained by the storage device, as the first data, and the cache unit, when determining whether or not to retain the first data, determines to retain the first data if the first data are included in a data block stored as the first data.

(Supplementary Note 11)

The cache device according to Supplementary Note 3, wherein the storage area control unit, when causing the cache unit to store the first data, causes the cache unit to store a data block including the first data retained by the storage device, as the first data, and the cache unit, when determining whether or not to retain the first data, determines to retain the first data if the first data are included in a data block stored as the first data.

INDUSTRIAL APPLICABILITY

The present invention is applicable to control of cache data in a system including a plurality of servers, and a memory, an SSD, a hard disk, a disk array, a database, a server, or the like shared by each server.

The present invention is applicable to control of cache data in a system including a plurality of terminals, and a memory, an SSD, a hard disk, a disk array, a database, a server, or the like shared by each terminal.

The present invention is applicable to control of cache data in a device including a plurality of CPUs, and a memory, an SSD, a hard disk, a disk array, a database, a server, or the like shared by each CPU.

The present invention is applicable to control of cache data in a multi-core CPU, and a memory, an SSD, a hard disk, a disk array, a database, a server, or the like shared by each core.

The present invention is applicable to control of cache data in a multithread-capable CPU, and a memory, an SSD, a hard disk, a disk array, a database, a server, or the like shared by each thread.

REFERENCE SIGNS LIST

100 Cache device
101 Cache unit
102 Storage area control unit
200 Storage device
300, 301 Source
110 Cache device
400, 401 Secondary cache device
120 Cache device
123 Communication unit
410, 411 Secondary cache device
130 Storage
131 Storage cache information control unit
132 Divided area determination unit
133 Access information control unit
134 Data discard determination unit
135 Divided area creation unit
138 Storage cache
139 HDD
330, 331, 332 Server
430, 431, 432 Server cache
140 Storage
143 Access information control unit
340, 341, 342 Server
440, 441, 442 Server cache
450, 451, 452 Server cache information control unit

The invention claimed is:

1. A cache device connected to a storage device and connected to a plurality of sources, the cache device comprising:
a cache unit that receives a first read request from a first of the sources, and, if not retaining first data specified in the first read request, transmits the first read request to the storage device, receives a first read response from the storage device, and transmits the first read response to the first source, and meanwhile, if retaining the first data, transmits a second read response including the first data to the first source; and
a storage area control unit that stores the first source as a first history in association with specification of the first data, and, if the first data are not retained by the cache unit and a storage area sufficient for retaining the first data exists in the cache unit, causes the cache unit to store the first data, and meanwhile, if the first data are not retained by the cache unit and a storage area sufficient for retaining the first data does not exist in the cache unit, selects data associated with a less number of the sources in the first history as second data in preference to data associated with a greater number of the sources in the first history out of the first data or data retained by the cache unit, and, if the second data differ from the first data, causes the cache unit to discard the second data and then store the first data.

2. The cache device according to claim 1, being connected to a plurality of the sources via one secondary cache device, respectively, wherein
the secondary cache device receives a second read request from the first source, and, if not retaining third data specified in the second read request, transmits the second read request to the storage device via the cache device, receives a third read response from the storage device via the cache device, and transmits the third read response to the first source, and meanwhile, if retaining the third data, transmits a fourth read response including the third data to the first source, and
the secondary cache device stores the first source as a second history in association with specification of the third data, and, if the third data are not retained and a storage area sufficient for retaining the third data exists, stores the third data, and meanwhile, if the third data are not retained and a storage area sufficient for retaining the third data does not exist, selects data less frequently associated with the source in the second history as fourth data in preference to data more frequently associated with the source in the second history out of the third data or retained data, and, if the fourth data differ from the third data, discards the fourth data and then stores the third data.

3. The cache device according to claim 1, being connected to a plurality of the sources via one secondary cache device, respectively, wherein
the cache device further comprises a communication unit that transmits information about the first history to the secondary cache device,
the secondary cache device receives a second read request from the first source, and, if not retaining third data specified in the second read request, transmits the second read request to the storage device via the cache device, receives a third read response from the storage device via the cache device, and transmits the third read response to the first source, and meanwhile, if retaining the third data, transmits a fourth read response including the third data to the first source, and
the secondary cache device, if the third data are not retained and a storage area sufficient for retaining the third data exists, stores the third data, and meanwhile, if the third data are not retained and a storage area sufficient for retaining the third data does not exist, acquires information about the first history from the cache device and selects data associated with a greater number of the sources in the first history as fifth data in preference to data associated with a less number of the sources in the first history out of the third data or retained data, and, if the fifth data differ from the third data, discards the fifth data and then stores the third data.

4. A secondary cache device connected to the storage device via the cache device according to claim 1 and connected to one source, respectively,
the secondary cache device acquiring information about the first history from the cache device and determining data to be discarded in accordance with the first history.

5. A secondary cache device connected to the storage device via the cache device according to claim 1 and connected to the first source, respectively, the secondary cache device comprising:
a secondary cache unit that receives a second read request from the first source, and, if not retaining third data specified in the second read request, transmits the second read request to the storage device via the cache device, receives a third read response from the storage device via the cache device, and transmits the third read response to the first source, and meanwhile, if retaining the third data, transmits a fourth read response including the third data to the first source; and a secondary storage area control unit that, if the third data are not retained and a storage area sufficient for retaining the third data exists, stores the third data, and meanwhile, if the third data are not retained and a storage area sufficient for retaining the third data does not exist, acquires information about the first history from the cache device and selects data associated with a greater number of the sources in the first history as fifth data in preference to data associated with a less number of the sources in the first history out of the third data or retained data, and if the fifth data differ from the third data, discards the fifth data and then stores the third data.

6. The cache device according to claim 1, wherein
the storage area control unit, when causing the cache unit to store the first data, causes the cache unit to store a data block including the first data retained by the storage device, as the first data, and
the cache unit, when determining whether or not to retain the first data, determines to retain the first data if the first data are included in a data block stored as the first data.

7. A cache system comprising:
a cache device connected to a storage device; and
a plurality of secondary cache devices connected to the storage device via the cache device, and connected to a first source within a plurality of sources, respectively, wherein
the cache device includes
a cache unit that receives a first read request from the first source via a secondary cache device within the secondary cache devices, and, if not retaining first data specified in the first read request, transmits the first read request to the storage device, receives a first read response from the storage device, and transmits the first read response to the first source via the secondary cache device, and meanwhile, if retaining the first data, transmits a second read response including the first data to the first source via the secondary cache device, and
a storage area control unit that stores the first source as a first history in association with specification of the first data, and, if the first data are not retained by the cache unit and a storage area sufficient for retaining the first data exists in the cache unit, causes the cache unit to store the first data, and meanwhile, if the first data are not retained by the cache unit and a storage area sufficient for retaining the first data does not exist in the cache unit, selects data associated with a less number of the sources in the first history as second data in preference to data associated with a greater number of the sources in the first history out of the first data or data retained by the cache unit, and, if the second data differ from the first data, causes the cache unit to discard the second data and then store the first data, and
the secondary cache device includes
a secondary cache unit that receives a second read request from the first source, and, if not retaining third data specified in the second read request, transmits the second read request to the storage device via the cache device, receives a third read response from the storage device via the cache device, and transmits the third read response to the first source, and meanwhile, if retaining the third data, transmits a fourth read response including the third data to the first source, and a secondary storage area control unit that, if the third data are not retained and a storage area sufficient for retaining the third data exists, stores the third data, and meanwhile, if the third data are not retained and a storage area sufficient for retaining the third data does not exist, acquires information about the first history from the cache device and selects data associated with a greater number of the sources in the first history as fourth data in preference to data associated with a less number of the sources in the first history out of the third data or retained data, and, if the fourth data differ from the third data, discards the fourth data and then stores the third data.

8. A cache method in a cache device connected to a storage device and connected to a plurality of sources, the cache method comprising:
receiving a first read request from a first of the sources, and, if not retaining first data specified in the first read request, transmitting the first read request to the storage device, receiving a first read response from the storage device, and transmitting the first read response to the first source, and meanwhile, if retaining the first data, transmitting a second read response including the first data to the first source; and
storing the first source as a first history in association with specification of the first data, and, if the first data are not retained and a storage area sufficient for retaining the first data exists, storing the first data, and meanwhile, if the first data are not retained and a storage area sufficient for retaining the first data does not exist, selecting data associated with a less number of the sources in the first history as second data in preference to data associated with a greater number of the sources in the first history out of the first data or retained data, and, if the second data differ from the first data, discarding the second data and then storing the first data.

9. The cache device according to claim 2, wherein
the storage area control unit, when causing the cache unit to store the first data, causes the cache unit to store a data block including the first data retained by the storage device, as the first data, and
the cache unit, when determining whether or not to retain the first data, determines to retain the first data if the first data are included in a data block stored as the first data.

10. The cache device according to claim 3, wherein
the storage area control unit, when causing the cache unit to store the first data, causes the cache unit to store a data block including the first data retained by the storage device, as the first data, and
the cache unit, when determining whether or not to retain the first data, determines to retain the first data if the first data are included in a data block stored as the first data.

* * * * *